(12) United States Patent
Jun et al.

(10) Patent No.: US 9,959,984 B2
(45) Date of Patent: May 1, 2018

(54) THREE-DIMENSIONAL GRAPHENE COMPOSITE, PREPARATION METHOD FOR THE SAME, AND SUPERCAPACITOR COMPRISING THE SAME

(71) Applicant: INDUSTRY-ACADEMIC COOPERATION FOUNDATION YONSEI UNIVERSITY, Seoul (KR)

(72) Inventors: Seong Chan Jun, Seoul (KR); Ji Soo Sohn, Seoul (KR); Umakant Mahadev Patil, Seoul (KR); Sachin Babasaheb Kulkarni, Seoul (KR); Su Chan Lee, Ulsan (KR)

(73) Assignee: INDUSTRY-ACADEMIC COOPERATION FOUNDATION YONSEI UNIVERISTY, Seoul (KR)

( * ) Notice: Subject to any disclaimer, the term of this patent is extended or adjusted under 35 U.S.C. 154(b) by 74 days.

(21) Appl. No.: 14/613,542

(22) Filed: Feb. 4, 2015

(65) Prior Publication Data
US 2015/0340170 A1    Nov. 26, 2015

(30) Foreign Application Priority Data
May 20, 2014  (KR) .................. 10-2014-0060288

(51) Int. Cl.
*H01B 1/04* (2006.01)
*H01B 1/02* (2006.01)
(Continued)

(52) U.S. Cl.
CPC .......... *H01G 11/28* (2013.01); *C01B 32/186* (2017.08); *C01B 32/194* (2017.08); *C01G 45/02* (2013.01);
(Continued)

(58) Field of Classification Search
CPC ...... H01B 1/02–1/04; C01B 1/02–1/04; C01B 32/192; C01B 32/182;
(Continued)

(56) References Cited

U.S. PATENT DOCUMENTS

2015/0340171 A1* 11/2015 Li ..................... H01G 11/32
                                              252/508

FOREIGN PATENT DOCUMENTS

CN    102903533 A    1/2013
KR    2009-0026356 A    3/2009
(Continued)

OTHER PUBLICATIONS

Ji ("Nanoporous Ni(OH)2 Thin Film on 3D Ultrathin-Graphite Foam for Asymmetric Supercapacitor." ACSNano, 7, pp. 6237-6243, online Jun. 11 2013).*
(Continued)

*Primary Examiner* — Tri V Nguyen
(74) *Attorney, Agent, or Firm* — LRK Patent Law Firm

(57) ABSTRACT

The present invention relates to a three-dimensional graphene composite, a preparation method for the same, and a supercapacitor including the same, and more particularly to a three-dimensional graphene composite including at least one electrode material nanoparticle selected from a transition metal hydroxide, a transition metal oxide and a conducting polymer as adsorbed onto the surface of a three-dimensional graphene foam, a preparation method for the three-dimensional graphene composite, and a supercapacitor including the three-dimensional graphene composite.

2 Claims, 43 Drawing Sheets

(51) Int. Cl.
| | |
|---|---|
| B82Y 40/00 | (2011.01) |
| H01G 11/28 | (2013.01) |
| H01G 11/30 | (2013.01) |
| H01G 11/32 | (2013.01) |
| H01G 11/46 | (2013.01) |
| H01G 11/48 | (2013.01) |
| H01G 11/86 | (2013.01) |
| C01G 45/02 | (2006.01) |
| C01G 53/00 | (2006.01) |
| C01G 53/04 | (2006.01) |
| H01G 11/36 | (2013.01) |
| C01B 32/186 | (2017.01) |
| C01B 32/194 | (2017.01) |

(52) U.S. Cl.
CPC ............ *C01G 53/00* (2013.01); *C01G 53/04* (2013.01); *H01G 11/30* (2013.01); *H01G 11/32* (2013.01); *H01G 11/36* (2013.01); *H01G 11/46* (2013.01); *H01G 11/48* (2013.01); *H01G 11/86* (2013.01); *C01P 2004/30* (2013.01); *Y02E 60/13* (2013.01); *Y10T 428/24999* (2015.04); *Y10T 428/249991* (2015.04)

(58) Field of Classification Search
CPC ......... H01M 2300/0088; H01M 4/134; H01M 4/366; H01M 4/48; H01M 4/625
USPC ............... 252/500–519.1, 506, 508, 518.1; 423/445 R–448; 977/775, 776, 781
See application file for complete search history.

(56) References Cited

FOREIGN PATENT DOCUMENTS

| KR | 2011-0038395 A | 4/2011 |
| KR | 2011-0091968 A | 8/2011 |
| KR | 2012-0041479 A | 5/2012 |

OTHER PUBLICATIONS

Wang ("Controlled synthesis of MnSn(OH)6/graphene nanocomposites and their electrochemical properties as capacitive materials." J of Solid State Chem, 185, pp. 172-179, online Nov. 15, 2011).*

Zhao ("Synthesis of Co(OH)2/graphene/Ni foam nano-electrodes with excellent pseudocapacitive behavior and high cycling stability for supercapacitors." Intern J of Hydrogen Energy, 37, pp. 11846-11852, online Jun. 22, 2012).*

Cheng ("Improving the performance of cobalt—nickel hydroxidebased self-supporting electrodes for supercapacitors using accumulative approaches." Energy & Environ Sc, 6, pp. 3314-3321, pub Aug. 14, 2013).*

Yulian ("High-performance supercapacitors materials prepared via in situ growth of NiAl-layered double hydroxide nanoflakes on well-activated graphene nanosheets." Elect Acta, 94, pp. 360-366, pub Sep. 29, 2012).*

Gao ("Graphene Nanosheet/Ni2+/Al3+ Layered Double-Hydroxide Composite as a Novel Electrode for a Supercapacitor." Chem Mater, 23, pp. 3509-3516, pub Jul. 7, 2011).*

Hao (Facile synthesis of three dimensional hierarchical Co—Al layered double hydroxides on graphene as high-performance materials for supercapacitor electrode. Journal of Colloid and Interface Science 426 (2014) 131-136) (Year: 2014).*

Dong ("Layer-by-Layer Engineered Co Al Hydroxide Nanosheets/ Graphene Multilayer Films as Flexible Electrode for Supercapacitor." Langmuir 2012, 28, 293-298) (Year: 2012).*

Zhao ("Ultrahigh capacitive performance from both Co(OH)2/ graphene electrode and K3Fe(Cn)6 electrolyte." Scientific Reports | 3 : 2986, pub 2013) (Year: 2013).*

Xiayuan Liu et al., "Hierarchical NiCo2O4@NiCo2O4 Core/Shell Nanoflake Arrays as High-Performance Materials", ACS Applied Materials & Interfaces, 2013, 5, pp. 8790-8795, American Chemical Society Supercapacitor.

Zongping Chen et al., "Three-dimensional flexible and conductive interconnected graphene networks grown by chemical vapour deposition", Nature Materials, vol. 10, Jun. 2011, pp. 424-428.

Ji Hye Kim et al., "Electochemical properties of CoNi(OH)2/VGCF composite for supercapacitors", Theories and Applications of Chem. Eng. 2010, vol. 16, No. 2, pp. 1694-1697.

Xian Qing-Long et al., "Preparation and Electrochemical Capacitance of α-Ni(OH)2 Synthesized by Microwave-assisted Hydrothermal Method", Journal of Inorganic Materials, vol. 25, No. 12, Dec. 2010, pp. 1268-1272.

Umakant M. Patil et al., "Enhanced Supercapacitive Performance of Chemically Grown Cobalt-Nickel Hydroxides on Three-Dimensional Graphene Foam Electrodes", ACS Applied Materials & Interfaces, Feb. 2014, 6, pp. 2450-2458, American Chemical Society.

\* cited by examiner

THREE-DIMENSIONAL GRAPHENE COMPOSITE, PREPARATION METHOD FOR THE SAME, AND SUPERCAPACITOR COMPRISING THE SAME

CROSS-REFERENCE TO RELATED APPLICATIONS

This application claims priority to Korean Application No. 10-2014-0060288, filed May 20, 2014, the contents of which are incorporated herein in their entirety.

BACKGROUND

The present invention relates to a three-dimensional graphene composite, a preparation method for the same, and a supercapacitor comprising the same, and more particularly to a three-dimensional graphene composite including at least one electrode material nanoparticle selected from a transition metal hydroxide, a transition metal oxide and a conducting polymer as adsorbed onto the surface of a three-dimensional graphene foam, a preparation method for the three-dimensional graphene composite, and a supercapacitor including the three-dimensional graphene composite.

With a recent rapid increase in the demands for portable electronic devices, energy storage devices capable of supplying high energy and high electric power are in great demand. In response to this, supercapacitors with relatively high energy density and high power density are highly favored as one of the electrochemical capacitors that have intermediate characteristics between electrolytic condensers and secondary batteries.

Supercapacitors, also called ultracapacitors, refer to an energy storage unit noticeably far higher in capacity than the conventional condensers or electrolytic capacitors. Supercapacitors are used as a power source that is able to hold a large amount of energy and emit high energy for several scores of seconds to several minutes. Supercapacitors are under spotlight in various industrial fields such as energy storage units for hybrid car, memory backup units for electronic device, industrial power supply, etc., as they are suitable to fill in the regions of performance characteristics in which the conventional energy storage units such as condensers (offering high power density but low energy density) or secondary batteries (offering high energy density but low power density) leave much to be desired.

There are three types of supercapacitors: electric double layer capacitors (EDLCs), pseudocapacitors, and hybrid capacitors.

EDLCs, utilizing physical adsorption/desorption of ions onto the surface of activated carbon to store the energy, advantageously exhibit high power characteristics, high charge/discharge efficiency and semi-permanent charge/discharge cycle but cannot meet the demands for high power because of their low specific capacity (SC), which is merely about one tenth of the specific capacity of lithium secondary batteries.

Hybrid capacitors, which use an active material applying a different mechanism to cathode and anode electrodes, offer higher energy density than the other types of capacitors but still has the difficulty of commercialization due to extreme complexity in the design and fabrication of the plate elements and high production cost.

Pseudocapacitors use the oxidation-reduction reaction of an active material of metal oxide or polymer with protons (Hf) in an aqueous electrolyte and have the limit of the working voltage to a certain value or below. But, there is a growing interest in the pseudocapacitors, which have the high energy density, several times higher than that of the EDLCs.

In general, examples of the materials for pseudocapacitor include metal oxides, metal hydroxides, or conducting polymers, which are very susceptible to the oxidation-reduction reaction. These materials are characterized by having a plurality of oxidized forms/structures. $RuO_2$ is emerging as one of the promising materials for pseudocapacitor but highly expensive and rate, so its application is much limited. Accordingly, there is a demand for developing a material for capacitor electrode that offers high specific capacity (SC) based on low cost and sufficient resource.

BRIEF SUMMARY

For solving the problem with the prior art, it is an object of the present invention to provide an electrode material nanoparticle/graphene foam composite obtained by effectively adsorbing an electrode material nanoparticle, such as transition metal hydroxide, transition metal oxide, conducting polymer, etc., onto a three-dimensional graphene foam having a large specific surface area.

In accordance with one embodiment of the present invention, in order to achieve the object of the present invention, there is provided a three-dimensional graphene composite that includes: a graphene foam having a three-dimensional structure with a plurality of pores; and an electrode material nanoparticle adsorbed onto the graphene foam, where the electrode material nanoparticle may include at least one selected from the group consisting of a transition metal hydroxide, a transition metal oxide, and a conducting polymer.

The transition metal hydroxide may include at least one selected from the group consisting of nickel-cobalt hydroxide (Ni—Co(OH)$_2$), cobalt hydroxide (Co(OH)$_2$), nickel hydroxide (Ni(OH)$_2$), copper hydroxide (Cu(OH)$_2$), nickel-aluminum hydroxide (Ni—Al(OH)$_2$), manganese-aluminum hydroxide (Mn—Al(OH)$_2$), and cobalt-aluminum hydroxide (Co—Al(OH)$_2$). The transition metal oxide may include at least one selected from the group consisting of manganese oxide (MnO$_2$), nickel oxide (NiO), cobalt oxide (CoO), nickel-cobalt oxide (NiCO$_2$O$_4$), copper oxide (CuO), ruthenium oxide (RuO$_2$), and iridium oxide (IrO$_2$). The conducting polymer may include at least one selected from the group consisting of polyaniline, polyethylenedioxythiophene (poly (3,4-ethylenedioxythiophene), PEDOT), and polypyrrole.

Further, the electrode material nanoparticle may include a compound represented by the following chemical formula 1:

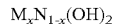   [Chemical Formula 1]

(In the chemical formula 1, M and N are the same or different from each other, each representing a transition metal, and combine together at a stoichiometric ratio of x:1−x, where 0≤x≤1)

In this regard, M and N of the chemical formula 1 may be nickel (Ni) and cobalt (Co), respectively. Preferably, the stoichiometric ratio of nickel (Ni) to cobalt (Co) is at least one selected from the group consisting of 1:0, 2:1, 1:1, 1:2, and 0:1. More preferably, the stoichiometric ratio of nickel (Ni) to cobalt (Co) is 1:2.

Further, the electrode material nanoparticle may be manganese oxide (MnO$_2$).

Further, the electrode material nanoparticle may be polyaniline.

In accordance with another embodiment of the present invention, there is provided a supercapacitor having the above-stated electrode using the three-dimensional graphene composite.

In accordance with further another embodiment of the present invention, in order to achieve the object of the present invention, there is provided a method for preparing a three-dimensional graphene composite including an electrode material particle adsorbed onto the surface of a graphene foam, where the method includes: depositing graphene on a molded foam having a three-dimensional structure and then dissolving a mold component to prepare a graphene foam having a three-dimensional structure; preparing a solution containing a precursor of the electrode material nanoparticle; and adsorbing the electrode material nanoparticle onto the surface of the graphene foam. The step of adsorbing the electrode material nanoparticle may include: (a) adding a reagent and distilled water to the solution to Prepare a mixed solution and immersing the graphene foam into the mixed solution through chemical bath deposition to form the electrode material nanoparticle according to a reaction and adsorb the electrode material nanoparticle onto the surface of the graphene foam; or (b) immersing the graphene foam into the mixed solution and applying a voltage by a cyclic voltammetry method to electrodeposit the electrode material nanoparticle onto the surface of the graphene foam.

In this regard, the electrode material nanoparticle may include at least one selected from the group consisting of a transition metal hydroxide, a transition metal oxide, and a conducting polymer.

Further, the step of adsorbing the electrode material nanoparticle may be the step (a), where the precursor of the electrode material nanoparticle is a salt of transition metal; the reagent is a reductant; and the electrode material nanoparticle is a compound represented by the following chemical formula 1:

$$M_xN_{1-x}(OH)_2 \quad \text{[Chemical Formula 1]}$$

(In the chemical formula 1, M and N are the same or different from each other, each representing a transition metal, and combine together at a stoichiometric ratio of x:1−x, where 0≤x≤1)

In this regard, M and N of the chemical formula 1 may be nickel (Ni) and cobalt (Co), respectively. Preferably, the stoichiometric ratio of nickel (Ni) to cobalt (Co) is at least one selected from the group consisting of 1:0, 2:1, 1:1, 1:2, and 0:1. More preferably, the stoichiometric ratio of nickel (Ni) to cobalt (Co) is 1:2.

Further, the step of adsorbing the electrode material nanoparticle may be the step (a), where the precursor of the electrode material nanoparticle is a salt of manganese; the reagent is a reductant; and the electrode material nanoparticle is manganese oxide ($MnO_2$).

Further, the step of adsorbing the electrode material nanoparticle may be the step (a), where the precursor of the electrode material nanoparticle is aniline; the reagent is an initiator; and the electrode material nanoparticle is polyaniline.

Further, the step of adsorbing the electrode material nanoparticle may be the step (b), where the precursor of the electrode material nanoparticle is a salt of cobalt; the reagent is a conducting material; and the electrode material nanoparticle is cobalt hydroxide ($Co(OH)_2$).

The above-described three-dimensional graphene composite, preparation method for the same, and supercapacitor comprising the same according to the present invention can be used to provide supercapacitor electrodes with greatly enhanced electrostatic capacity and high energy density, by using a foaming resin structure made of a thin graphene frame to achieve lightweightness and also effectively depositing a nanostructure through a relatively simple and economic method such as chemical bath deposition or electrodeposition, based on an electron collector with high conductivity

DETAILED DESCRIPTION

Figure 1A:
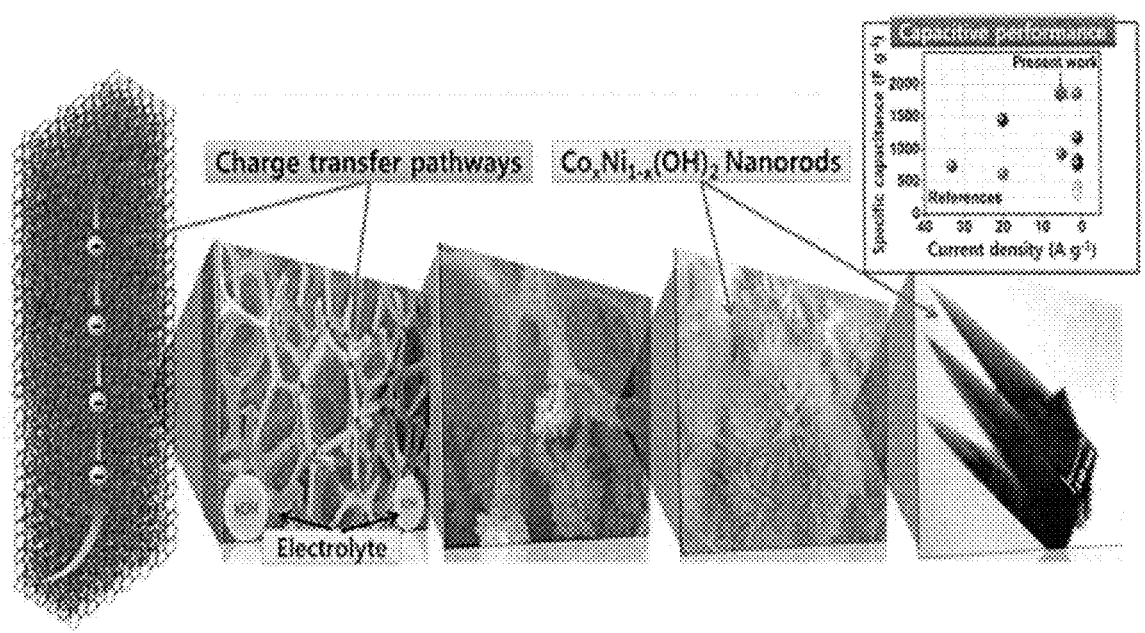
FIGS. 1A to 1T illustrate Example 1 using $Ni_xCo_{1-x}(OH)_2$ as an electrode material nanoparticle.

Reference will be now made in detail to embodiments of the present disclosure with reference to the attached drawings. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure.

The present invention, according to a preferred embodiment, provides a three-dimensional graphene composite having an electro material nanoparticle adsorbed onto a three-dimensional graphene foam through immersion. The three-dimensional graphene composite includes: graphene foam having a three-dimensional structure with a plurality of pores; and an electrode material nanoparticle adsorbed onto the graphene foam, where the electrode material nanoparticle may include at least one selected from the group consisting of a transition metal hydroxide, a transition metal oxide, and a conducting polymer.

The transition metal hydroxide may include at least one selected from the group consisting of nickel-cobalt hydroxide (Ni—$Co(OH)_2$), cobalt hydroxide ($Co(OH)_2$), nickel hydroxide ($Ni(OH)_2$), copper hydroxide ($Cu(OH)_2$), nickel-aluminum hydroxide (Ni—$Al(OH)_2$), manganese-aluminum hydroxide (Mn—$Al(OH)_2$), and cobalt-aluminum hydroxide (Co—$Al(OH)_2$). The transition metal oxide may include at least one selected from the group consisting of manganese oxide ($MnO_2$), nickel oxide (NiO), cobalt oxide (CoO), nickel-cobalt oxide ($NiCo_2O_4$), copper oxide (CuO), ruthenium oxide ($RuO_2$), and iridium oxide ($IrO_2$). The conducting polymer may include at least one selected from the group consisting of polyaniline, polyethylenedioxythiophene (poly (3,4-ethylenedioxythiophene), PEDOT), and polypyrrole.

Further, the present invention provides a method for preparing a three-dimensional graphene composite including an electrode material nanoparticle adsorbed onto the surface of a graphene foam.

First of all, there is performed a step of depositing graphene on a molded foam having a three-dimensional structure and then dissolving out the component to prepare a graphene foam having a three-dimensional structure. The molded foam may come in different shapes. Preferably, a nickel (Ni) foam having pores with an average diameter of 100 to 200 μm may be used considering ease of purchase, feasibility of etching, etc. For supercapacitors, the optimal pore size is known in the range of about 20 to 50 μm. It is preferable to use the initial molded foam having a pore size in the above-defined range, as a transition metal hydroxide is later adsorbed into the pores of the resulting three-dimensional graphene foam through immersion to cover the three-dimensional graphene foam.

Graphene, which is emerging as an advanced material, refers to a graphite material consisting of one to five graphite sheets with a beehive (hexagonal) pattern. Graphene has a two-dimensional carbon structure being the thinnest material even known, only one atom thick. Graphene is known to be superior in properties to carbon nanotubes and particularly exhibits considerably goad electrical characteristics.

Such a very large surface area in relation to the volume and hence high electrical conductivity lead to a greatly enhanced electrical performance of graphene, and a higher electron mobility through the graphite sheets than other materials renders the graphene to emerge as one of the most promising materials suitable for electronic devices.

However, graphene is poor in availability and processability and thus its applications have not been yet studied despite the worldwide attentions to graphene. Therefore, the inventors of the present invention contrive a novel material obtained by preparing a three-dimensional graphene foam indirectly using a three-dimensional molded foam and then adsorbing an electrode material nanoparticle selected from a transition metal hydroxide, a transition metal oxide, and a conducting polymer onto the three-dimensional graphene foam, only to overcome the poor availability and processability and offer economic feasibility and high electrical conductivity.

In order to prepare a three-dimensional graphene foam with an optimal specific surface area using a molded foam, it is preferable to deposit graphene on the molded foam by a CVD method, that is, a chemical vapor deposition method. More specifically, a step is performed that includes adding a precursor of graphene, preferably methane ($CH_4$) gas, hydrogen ($H_2$) gas, or argon (Ar) gas, together with a nickel foam into a reaction chamber and then performing a heat treatment at a temperature range of 800 to 1,500° C., which is the optimal temperature range for activating the graphene precursor, to deposit graphene on the nickel foam.

For immobilization of graphene, the graphene thus obtained is immersed in a methacryl resin solution, preferably a poly(methyl methacrylate) (PMMA) solution and then dried out. To eliminate the nickel component from the dried graphene-nickel foam, the graphene-nickel foam is dissolved in a $FeCl_3$/HCl solution and subjected to the wet etching method to prepare a three-dimensional graphene foam having an optimal specific surface area.

The subsequent step is preparing a solution containing the precursor of the electrode material nanoparticle and finally adsorbing the electrode material nanoparticle onto the surface of the graphene foam.

The step of adsorbing the electrode material nanoparticle largely includes: (a) adding a reagent and distilled water to the solution to prepare a mixed solution and immersing the graphene foam into the mixed solution through chemical bath deposition to form the electrode material nanoparticle according to a reaction and adsorb the electrode material nanoparticle onto the surface of the graphene foam; or (b) immersing the graphene foam into the mixed solution and applying a voltage by a cyclic voltammetry method to electrodeposit the electrode material nanoparticle onto the surface of the graphene foam.

The chemical bah deposition is one of the relatively simple thin film deposition methods that involves immersing an object material such as a substrate into an aqueous solution containing a desired deposition material or its precursor and applying heat or pressure to the object material to deposit the desired deposition material on the object material.

The mixed solution may be prepared by mixing a precursor of the electrode material nanoparticle, a reagent, and distilled water together under agitation. A transition metal oxide/hydroxide, used as the transition metal nanoparticle, is a substance corresponding to a representative pseudocapacitor material. Examples of the transition metal oxide/hydroxide available may include $MnO_2$, $Mn_3O_4$, $Fe_3O_4$, $Fe_2O_3$, $Co_2O_3$, $Co_3O_4$, NiO, CuO, $SnO_2$, $In_2O_3$, $In(OH)_3$, $Bi_2O_3$, $V_2O_3$, $TiO_2$, etc. According a preferred embodiment, the present invention uses a transition metal hydroxide or a transition metal oxide represented by the following chemical formula 1:

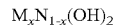
[Chemical Formula 1]

$M_xN_{1-x}(OH)_2$ (In the chemical formula 1, M and N are the same or different from each other, each representing a transition metal, and combine together at a stoichiometric ratio of x:1−x, where 0≤x≤1)

In this regard, M and N of the chemical formula 1 is preferably nickel (Ni) and cobalt (Co), respectively. More preferably, the stoichiometric ratio of nickel (Ni) to cobalt (Co) is at least one selected from the group consisting of 1:0, 2:1, 1:1, 1:2, and 0:1. Most preferably, the stoichiometric ratio of nickel (Ni) to cobalt (Co) is 1:2. This will be described in further detail later with reference to the Examples below.

In addition, the reagent may be a reductant, which activates the functional groups to modify the surface of the three-dimensional graphene foam. As more functional groups, such as carboxy groups, hydroxyl groups and epoxy groups, are activated on the surface of the three-dimensional graphene foam, the final nucleation takes place more easily when adsorbing the transition metal hydroxide onto the surface of the three-dimensional graphene foam by the subsequent chemical bath deposition method. For this, the reductant is preferably an alkali solution, and most preferably urea or ammonium persulfate (($NH_4$)$_2S_2O_8$) in the aspect of achieving the reductive function.

The subsequent step is immersing the three-dimensional graphene foam into the mixed solution prepared using the chemical bath deposition method to form the electrode material nanoparticle according to a reaction and adsorb the electrode material nanoparticle onto the surface of the three-dimensional graphene foam.

In this regard, the mixed solution into which the three-dimensional graphene foam is heated at 90 to 140° C. for 2 to 6 hours to accomplish a gradual adsorption, which can optimize the three steps of "nucleation, binding and particle deposition" to more efficiently adsorb the transition metal hydroxide.

According to the above-described method, it is possible to prepare a final three-dimensional graphene composite having the electrode material nanoparticle, more specifically, nickel-cobalt hydroxide, nickel hydroxide, cobalt hydroxide, or manganese oxide adsorbed on the surface. The three-dimensional graphene composite can be used to form either a cathode electrode or an anode electrode, or both the cathode and anode electrodes and manufacture a supercapacitor.

Such a hybrid composite made of transition metal hydroxide as a pseudocapacitor material and graphene as an electric double layer capacitor material can be used to prepare a supercapacitor with remarkably enhanced electrostatic performance and high energy density.

Hereinafter, a detailed description will be given as to the three-dimensional graphene composite, preparation method for the same, and supercapacitor comprising the same according to the present invention with reference to exemplary embodiments, which are provided as the most preferable embodiments of the present invention and should not be construed as representing all the technical concepts of the present invention. It will be understood at the application time of the present invention that the present invention includes all the equivalents and modifications of the exemplary embodiments.

Figure 1B:
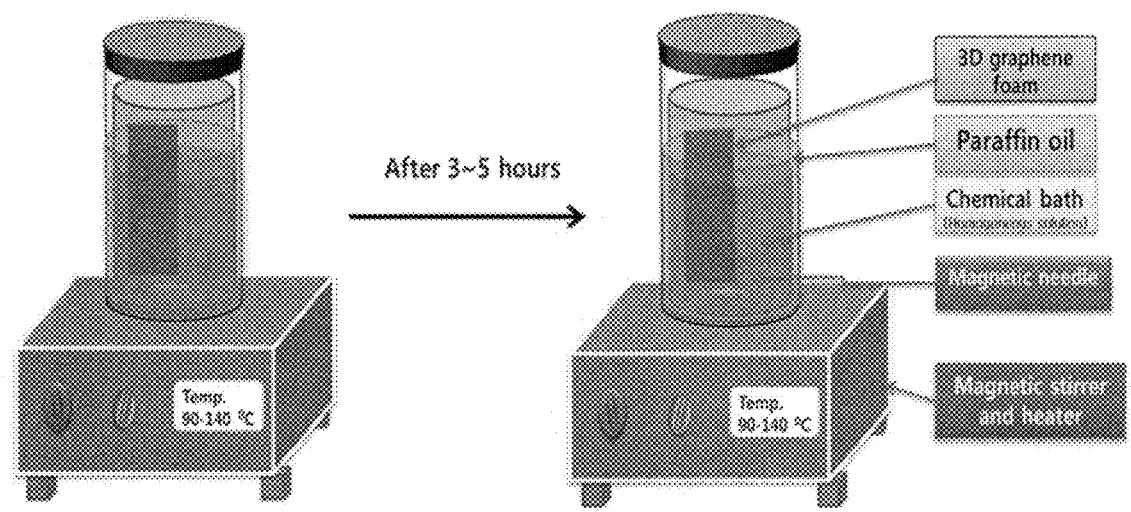
Figure 1C:
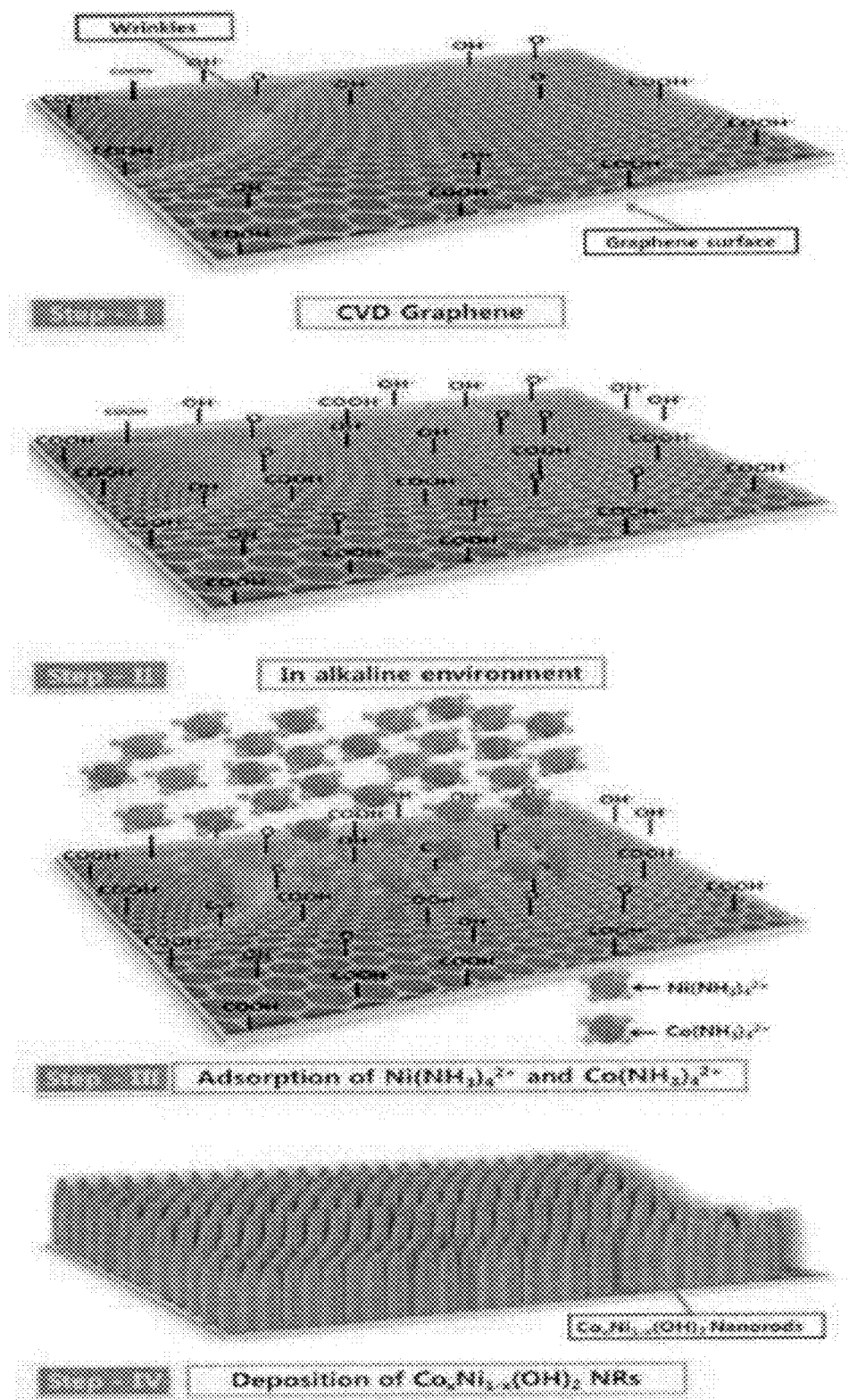

[Example 1] The Use of $Ni_xCo_{1-x}(OH)_2$ as an Electrode Material Nanoparticle FIG. 1A shows a representation of the whole concept of the present example, FIG. 1B the coating process according to the chemical bath deposition method, and FIG. 1C the entire preparation process.

Sample 1. Three-Dimensional Graphene Composite with Adsorbed $Ni_1Co_0(OH)_2(Ni(OH)_2)$ A nickel foam 2 cm×3 cm in size is put into a tube type furnace and, after addition of $CH_4$, $H_2$ and Ar gas, a heat treatment is carried out at an elevated temperature up to 1,000° C. for 3 hours to deposit graphene on the nickel foam. Then, the graphene-nickel foam thus obtained is immersed into a small amount of PMMA solution for about 10 seconds and then naturally dried out for about 3 hours.

In order to eliminate the nickel component from the graphene-nickel foam, the graphene-nickel foam is immersed into a $FeCl_3$/HCl solution and stood still for about 4 days to sufficiently dissolve the nickel contained in the foam into the solution.

To remove the remaining $FeCl_3$/HCl, the foam is sufficiently washed with distilled water until the pH becomes neutral, dried out and then exposed to acetone vapor at the room temperature for more than 4 days. This procedure completely removes the foam of the remaining PMMA to yield a graphene foam having a three-dimensional structure.

After the preparation of the graphene foam, nickel (II) nitrate hexahydrate $(Ni(NO_3)_2.6H_2O)$ and urea $(CO(NH_2)_2)$ are mixed at a weight ratio of 2:5 and added to 50 ml of distilled water. The resulting mixture is mechanically stirred for about 10 minutes to prepare a homogeneous mixed solution. The graphene foam is immersed into the mixed solution, which is then warmed up at 120° C. for about 4 hours. In this regard, for the purpose of uniform heat supply, the container containing the mixed solution is preferably surrounded with paraffin oil and continuously stirred with a magnetic stirrer. Subsequently, the mixed solution is naturally cooled down to the room temperature.

After the hydroxide is all adsorbed onto the surface of the graphene foam, distilled water is used to wash the sample to eliminate all the residues from the surface of the sample.

Sample 2. Three-Dimensional Graphene Composite with Adsorbed $Ni_{0.66}Co_{0.33}(OH)_2$ The procedures are performed in the same manner as described in Sample 1 to form a three-dimensional graphene composite with adsorbed nickel-cobalt hydroxide, excepting that the mixed solution is prepared by using nickel (II) nitrate hexahydrate $(Ni(NO_3)_2.6H_2O)$ and cobalt (II) nitrate hexahydrate $(Co(NO_3)_2.6H_2O)$ at a stoichiometric ratio of 2:1 to yield a final adsorbed hydroxide having a chemical formula of $Ni_{0.66}Co_{0.33}(OH)_2$, while the proportion of the nickel (II) nitrate hexahydrate $(Ni(NO_3)_2.6H_2O)$ used in Sample 1 is 1.

Sample 3. Three-Dimensional Graphene Composite with Adsorbed $Ni_{0.50}Co_{0.50}(OH)_2$ The procedures are performed in the same manner as described in Sample 1 to form a three-dimensional graphene composite with adsorbed nickel-cobalt hydroxide, excepting that the mixed solution is prepared by using nickel (II) nitrate hexahydrate $(Ni(NO_3)_2.6H_2O)$ and cobalt (II) nitrate hexahydrate $(Co(NO_3)_2.6H_2O)$ at a stoichiometric ratio of 1:1 to yield a final adsorbed hydroxide having a chemical formula of $Ni_{0.50}Co_{0.50}(OH)_2$, while the proportion of the nickel (II) nitrate hexahydrate $(Ni(NO_3)_2.6H_2O)$ used in Sample 1 is 1.

Sample 4. Three-Dimensional Graphene Composite with Adsorbed $Ni_{0.33}Co_{0.66}(OH)_2$ The procedures are performed in the same manner as described in Sample 1 to form a three-dimensional graphene composite with adsorbed nickel-cobalt hydroxide, excepting that the mixed solution is prepared by using nickel (II) nitrate hexahydrate $(Ni(NO_3)_2.6H_2O)$ and cobalt (II) nitrate hexahydrate $(Co(NO_3)_2.6H_2O)$ at a stoichiometric ratio of 1:2 to yield a final adsorbed hydroxide having a chemical formula of $Ni_{0.33}Co_{0.66}(OH)_2$, while the proportion of the nickel (II) nitrate hexahydrate $(Ni(NO_3)_2.6H_2O)$ used in Sample 1 is 1.

Sample 5. Three-Dimensional Graphene Composite with Adsorbed $Ni_0Co_1(OH)_2$

The procedures are performed in the same manner as described in Sample 1 to form a three-dimensional graphene composite with adsorbed nickel-cobalt hydroxide, excepting that the mixed solution is prepared by using cobalt (II) nitrate hexahydrate $(Co(NO_3)_2.6H_2O)$ alone to yield a final adsorbed hydroxide having a chemical formula of $Ni_0Co_1(OH)_2$, while the proportion of the nickel (II) nitrate hexahydrate $(Ni(NO_3)_2.6H_2O)$ used in Sample 1 is 1.

REFERENCES

Cobalt-nickel electrodes using different electron collectors as suggested by the following references are given as Comparative Examples.

Ref. 1-1. One-dimensional (1D) ultralayered mesoporous nickel-cobaltite $(NiCo_2O_4)$ nanowires electrode (Yuan, C.; Li, J.; Hou, L.; Yang, L.; Shen, L.; Zhang, X. J. Mater. Chem. 2012, 22, 16084-16090.)

Ref. 1-2. $NiCo_2O_4$ nanowire-graphene oxide nanocomposites electrode (Carriazo, D.; Patino, J.; Gutierrez, M. C.; Ferrer, M. L.; del Monte, F. RSC Adv. 2013, 3, 13690-13695.)

Ref. 1-3. $NiCo_2O_4$ and reduced graphene oxide (RGO) nanocomposites electrode (Wang, H.-W.; Hu, Z.-A.;

Chang, Y.-Q.; Chen, Y.-L.; Wu, H.-Y.; Zhang, Z.-Y.; Yang, Y.-Y. J. Mater. Chem. 2011, 21, 10504-10511.)

Ref. 1-4. Hierarchical porous spinel nickel cobaltite ($NiCo_2O_4$) nanowires electrode (Jiang, H.; Ma, J.; Li, C. Chem. Commun. 2012, 48, 4465-4467.)

Ref. 1-5. mesoporous nickel cobaltite ($NiCO_2O_4$) nanosheets (with Ni Foam) (Yuan, C.; Li, J.; Hou, L.; Zhang, X.; Shen, L.; Lou, X. W. D. Adv. Funct. Mater. 2012, 22, 4592-4597.)

Ref. 1-6. Template-free hierarchical porous nickel cobalt oxides ($NiCo_2O$)(with Ni Foam) (Chang, J.; Sun, J.; Xu, C.; Xu, H.; Gao, L. Nanoscale 2012, 4, 6786-6791.)

Ref. 1-7. nickel cobaltite ($NiCO_2O_4$) microspherical superstructures constructed by one-dimension nanowires (Wu, T.; Li, J.; Hou, L.; Yuan, C.; Yang, L.; Zhang, X. Electrochim. Acta 2012, 81, 172-178.)

Ref. 1-8. Nickel Cobaltite Nanowire $NiCoO_2$ (by hydrothermal and thermal-decomposition processes) (Wang, H.; Gao, Q.; Jiang, L. Small 2011, 7, 2454-2459.)

Ref. 1-9. Kulkarni, S. B.; Jagadale, A. D.; Kumbhar, V. S.; Bulakhe, R. N.; Joshi, S. S.; Lokhande, C. D. Int. Hydrogen Energy 2013, 38, 4046-4053

Ref. 1-10. Ghosh, D.; Giri, S.; Das, C. K. ACS Sustainable Chem. Eng. 2013, 1, 1135-1142

Ref. 1-11. Salunkhe, R. R.; Jang, K.; Lee, S.-w.; Yu, S.; Ahn, H. J. Mater. Chem. 2012, 22, 21630-21635

Experiment 1. Preparation of Electrode and Charge/Discharge Testing

The three-dimensional graphene composites prepared in Samples 1 to 5 are used as a working electrode, with an Ag/AgCl electrode used as a reference electrode and a Pt electrode as a relative electrode. Using a 1M KOH solution, the measurement is carried out at the room temperature. The testing is performed at the voltage interval ranging from 0 V to 0.5 V and the current density of 60 A/g to calculate the specific capacitance.

Figure 1D:
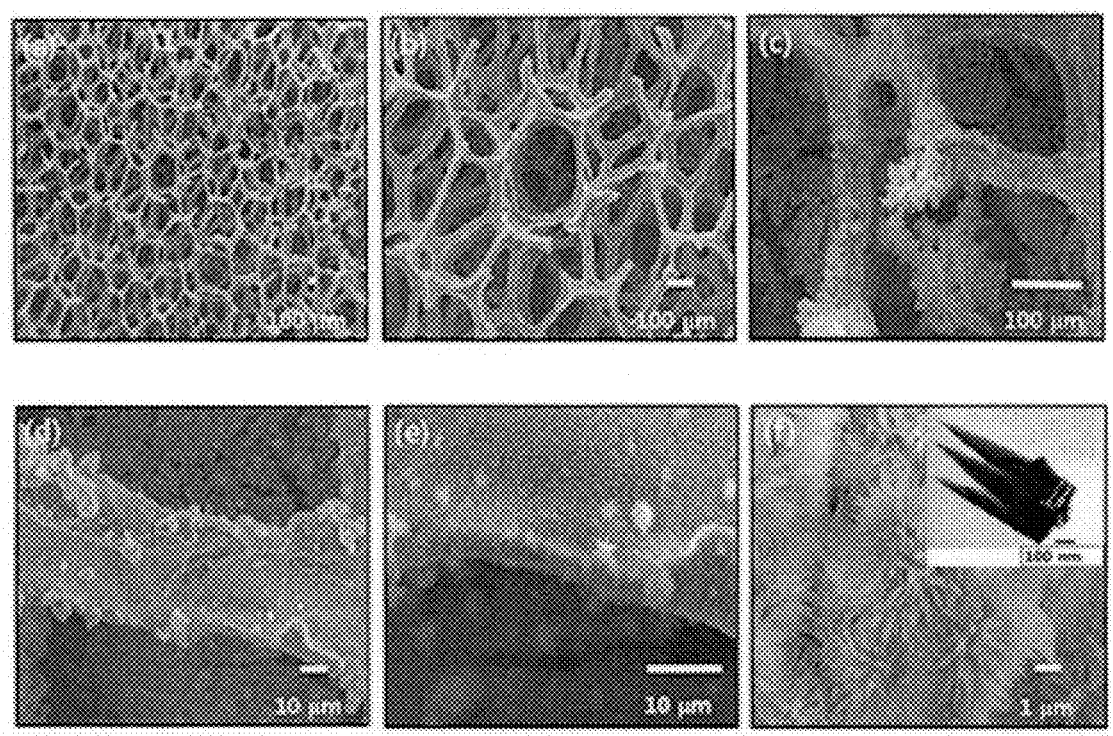

To evaluate the electrical characteristics as an electrode material, an electronic-chemical analyzer (ZIVE SP2 LAB analytical equipment, Korea) is used at the current density of 60 A/g to calculate the specific capacitance in the unit of farad (F). The measurement results are presented in the graph of FIG. 1G and Table 1.

TABLE 1

|  | Composition (Ni:Co) | Specific capacitance (F/g) |
| --- | --- | --- |
| Sample 1 | 1:0 | 130 |
| Sample 2 | 2:1 | 280 |
| Sample 3 | 1:1 | 596 |
| Sample 4 | 1:2 | 1280 |
| Sample 5 | 0:1 | 1130 |

Referring to Table 1, the three-dimensional graphene composite electrode according to the present invention exhibits a specific electrostatic capacity of 125 F/g or greater at the stoichiometric ratio of nickel to cobalt. Particularly, the maximum specific capacitance is 1280 F/g at the nickel-to-cobalt stoichiometric ratio of 1:2 and 1847 F/g at the nickel-to-cobalt stoichiometric ratio of 1:2 and the current density of 5 A/g. In this case, the energy density is 62 Wh/kg and the power density is 11 kW/kg. It is therefore possible to determine the optimal stoichiometric ratio of nickel to cobalt adsorbed onto the three-dimensional graphene composite as a supercapacitor electrode.

Figure 1E:
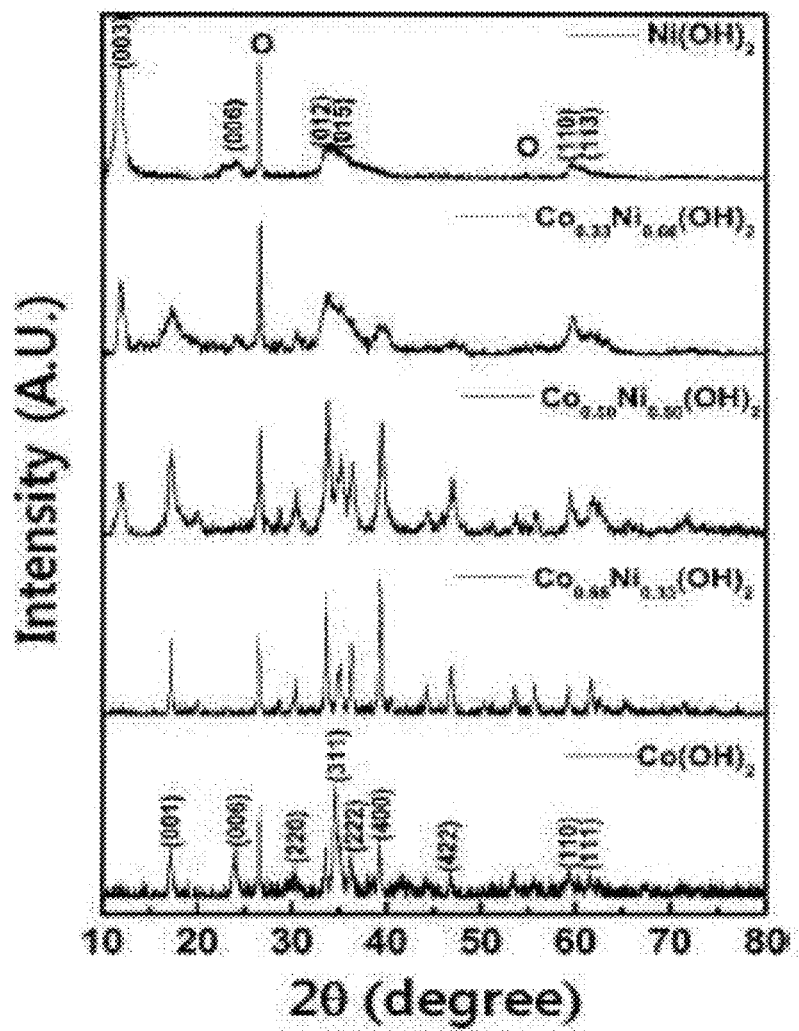
Figure 1F:
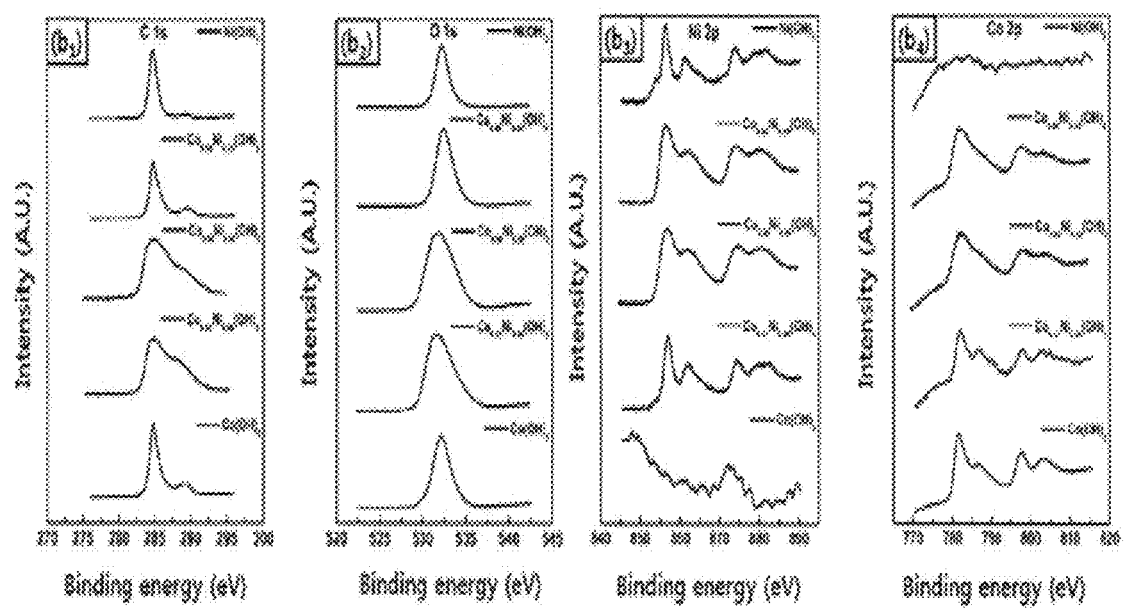
Figure 1G:
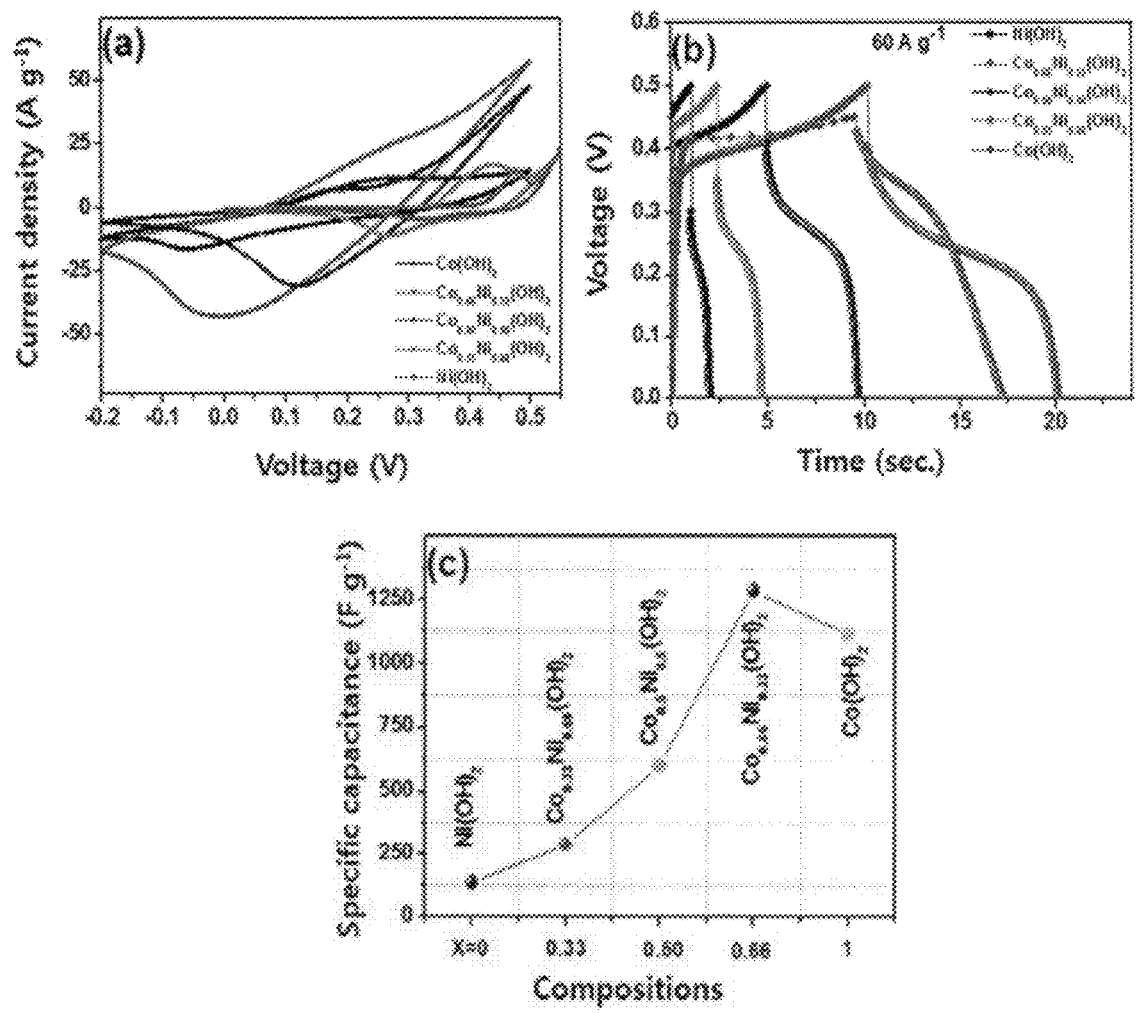
Figure 1H:
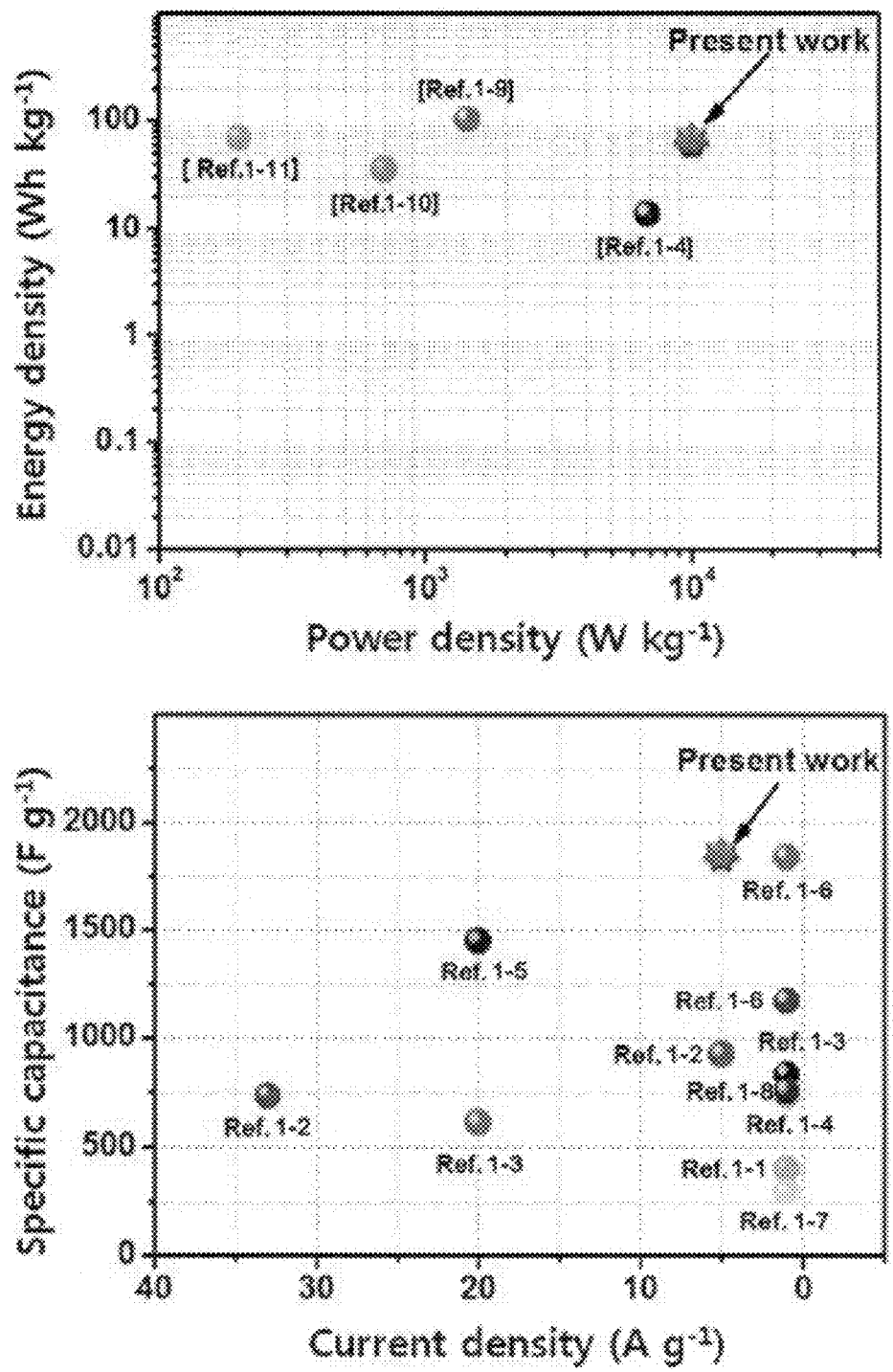

Referring to FIG. 1H, it can be seen that the maximum specific capacitance and the energy density of Example 1 are greater than those of the electron collectors disclosed in other reference documents.

Although the electrodes of Ref. 1 to 6 are superior in performance to the electrode of the present invention, the electrode of Ref. 6 which contains nickel foam leads to inefficiency that its industrial use for the capacitor actually increases the weight. Contrarily, it is more ideal to apply the present invention using a graphene foam lighter than the nickel foam in the industrial use.

Experiment 2. Surface Observation of Three-Dimensional Graphene Composite

The surface of the three-dimensional graphene composite prepared in Example 1 is observed with a field emission scanning electron microscope (FESEM; JSM-7001F, JEOL, Japan). The results are presented in FIG. 1D, where (a), (b) and (c) are images at low magnification; and (d) and (f) are images at high magnification.

Experiment 3. Observation of XRD, XPS Peeks for Examples

The respective three-dimensional graphene composite materials prepared according to Samples 1 to 5 are determined in regards to the structure using an X-ray diffractometer (XRD; Ultima (Cu-Kα radiation), Rigaku) and an X-ray photoelectron spectroscope (XPS; ESCALAB 250 (Thermo Fisher Scientific, UK)). The peek graphs are shown in FIGS. 1E and 1F.

Figure 1I:
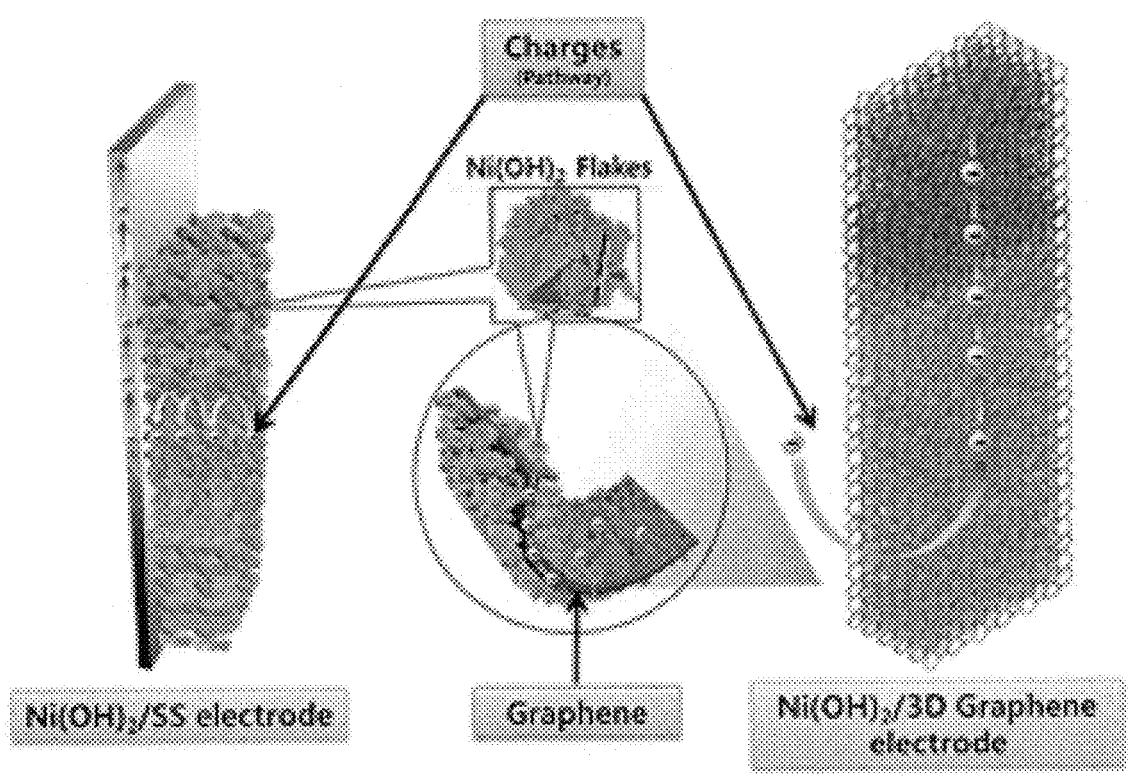

On the other hand, a separate testing is carried out on the composite prepared using a nickel hydroxide as an electrode material nanoparticle. The entire concept of using a nickel hydroxide as an electrode material nanoparticle is illustrated in FIG. 1I.

Experiment 4. Preparation of Electrode Using Nickel Hydroxide and Charge/Discharge Testing An electrode is prepared in the same manner as described in Sample 1 and then used as a working electrode, with an Ag/AgCl electrode used as a reference electrode and a Pt electrode as a relative electrode. Using a 1M KOH solution, the measurement is carried out at the room temperature.

The testing is performed at the voltage interval ranging from 0 V to 0.55 V and the scan rate of 20 to 100 mV/s to calculate the specific capacitance.

Figure 1J:
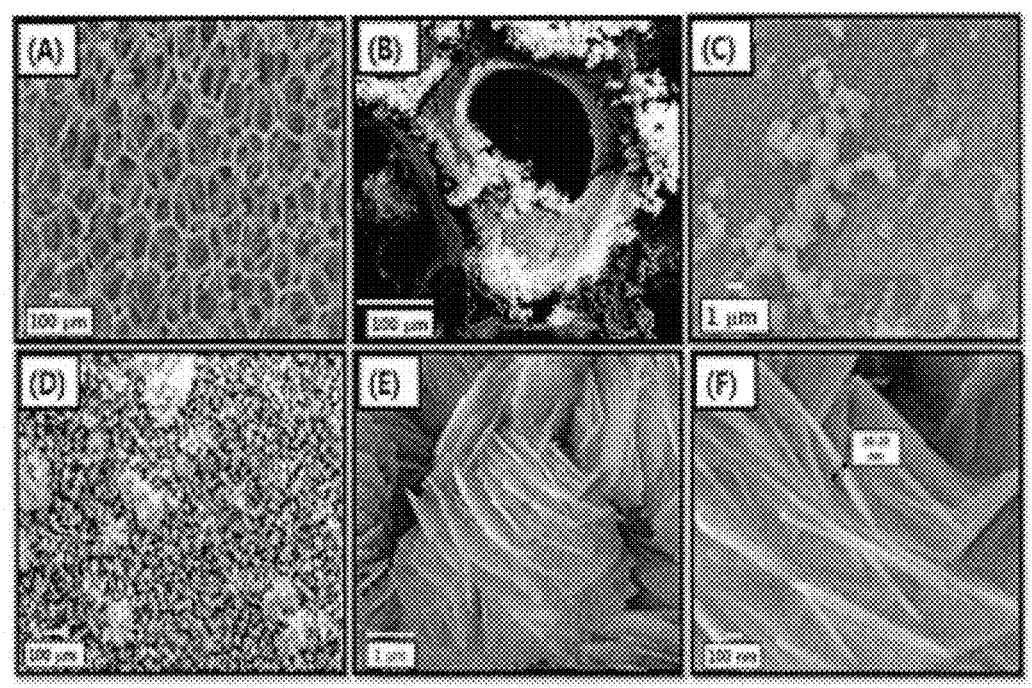
Figure 1K:
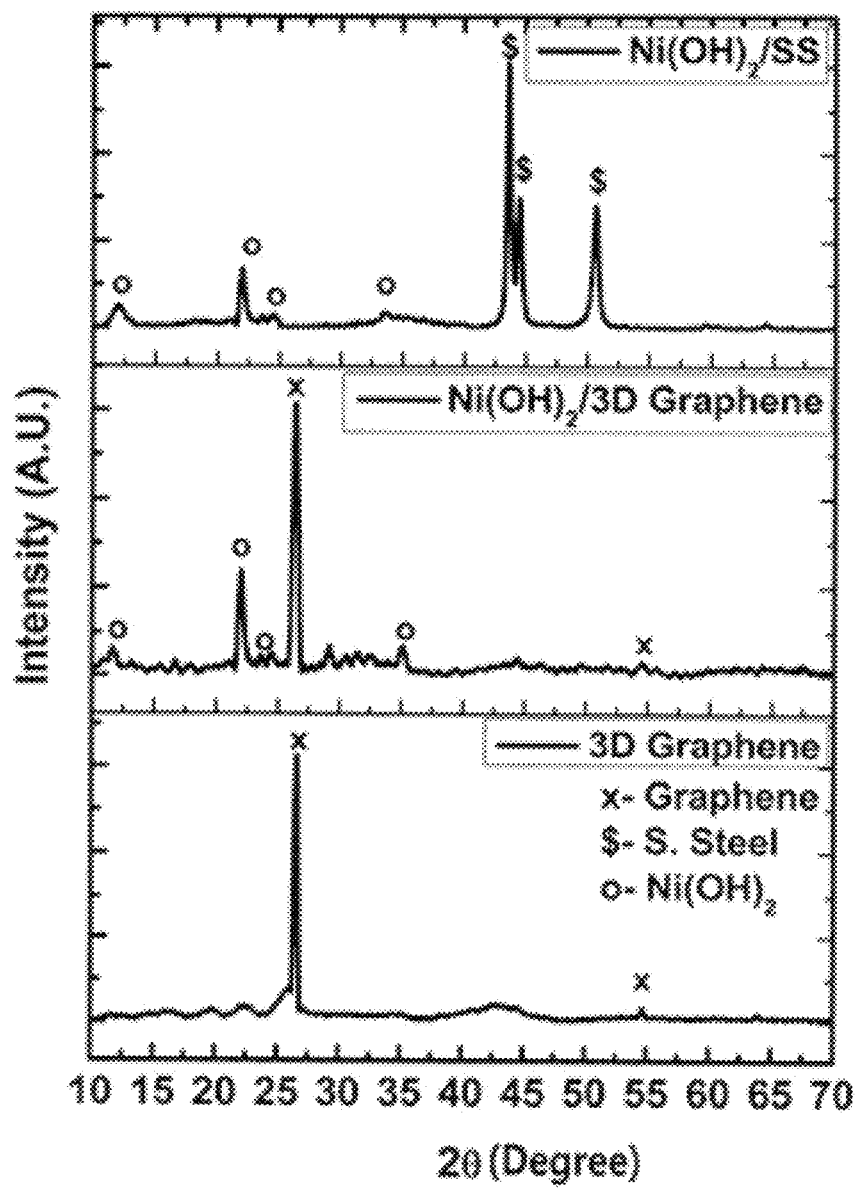
Figure 1L:
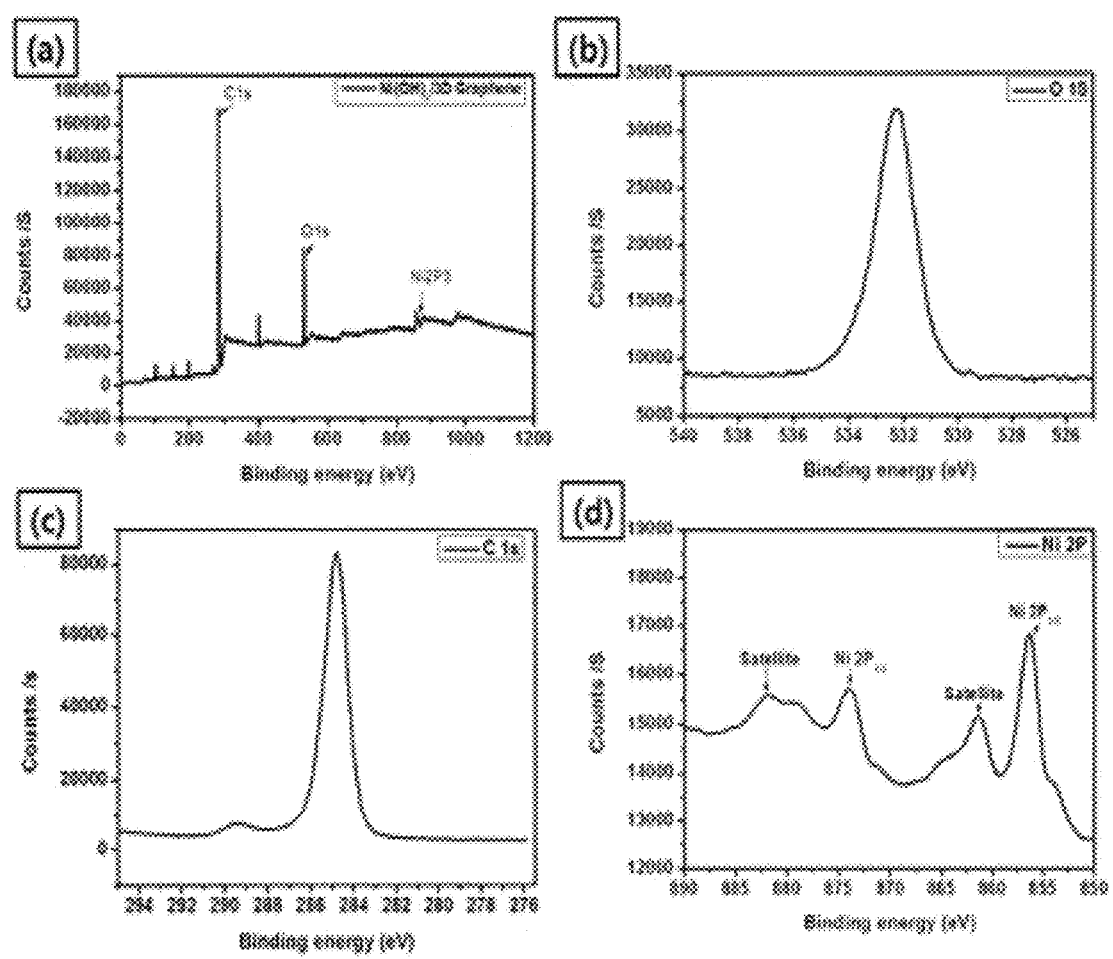
Figure 1M:
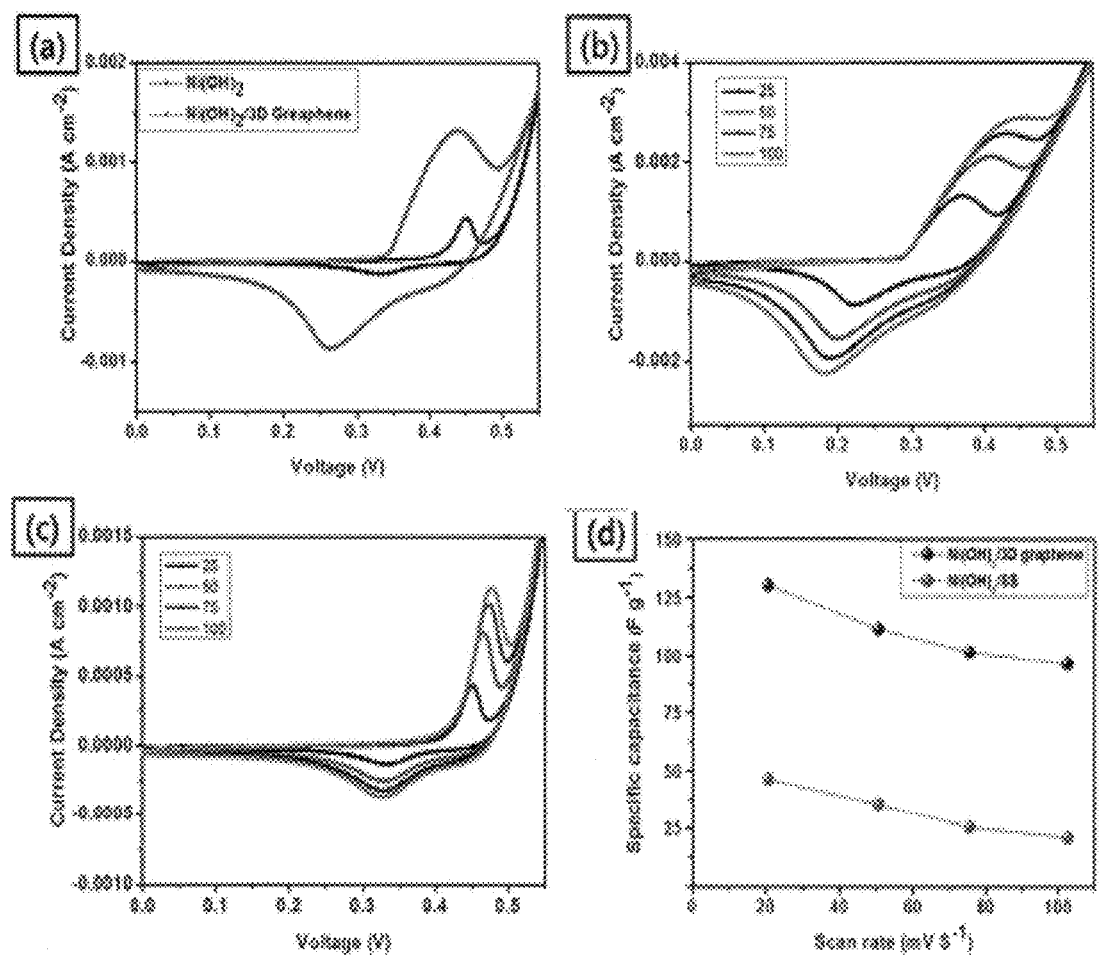
Figure 1N:
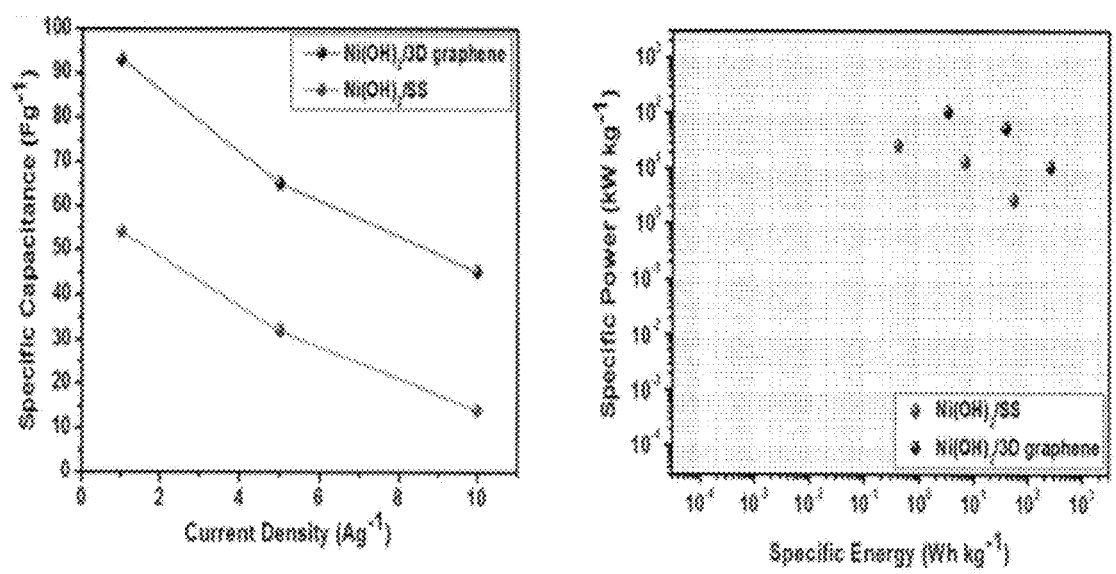

To evaluate the electrical characteristics as an electrode material, the same equipment as mentioned in Experiment 1 is used at the scan rate of 20 mV/s to calculate the specific capacitance in the unit of farad (F) (FIGS. 1M and 1N).

TABLE 2

| Electron collector | Specific capacitance (F/g) | Energy density (Wh/kg) | Power density (kW/kg) |
| --- | --- | --- | --- |
| Sample 1 | 130 | 16 | 4.6 |
| Stainless steel | 50 | 5.5 | 1.8 |

Referring to Table 2, the supercapacitor electrode according to Sample 1 which enables to use the three-dimensional graphene foam in an electron collector can exhibit a specific capacitance of 130 F/g, which is considerably far higher than the maximum specific capacitance of 50 F/g obtainable with the reference material, stainless steel, as the electron collector.

Experiment 5. Analysis on the Surface, Structure and Chemical Bonds of Electrode Using Nickel Hydroxide As for the nickel hydroxide/graphene foam composite prepared according to Sample 1, the surface is observed with a scanning electrode microscope (FIG. 1J), the composite structure is analyzed using the X-ray diffractometer (FIG. 1K), and the chemical bonds are identified by the X-ray photoelectron spectroscopy (FIG. 1L).

Figure 10:
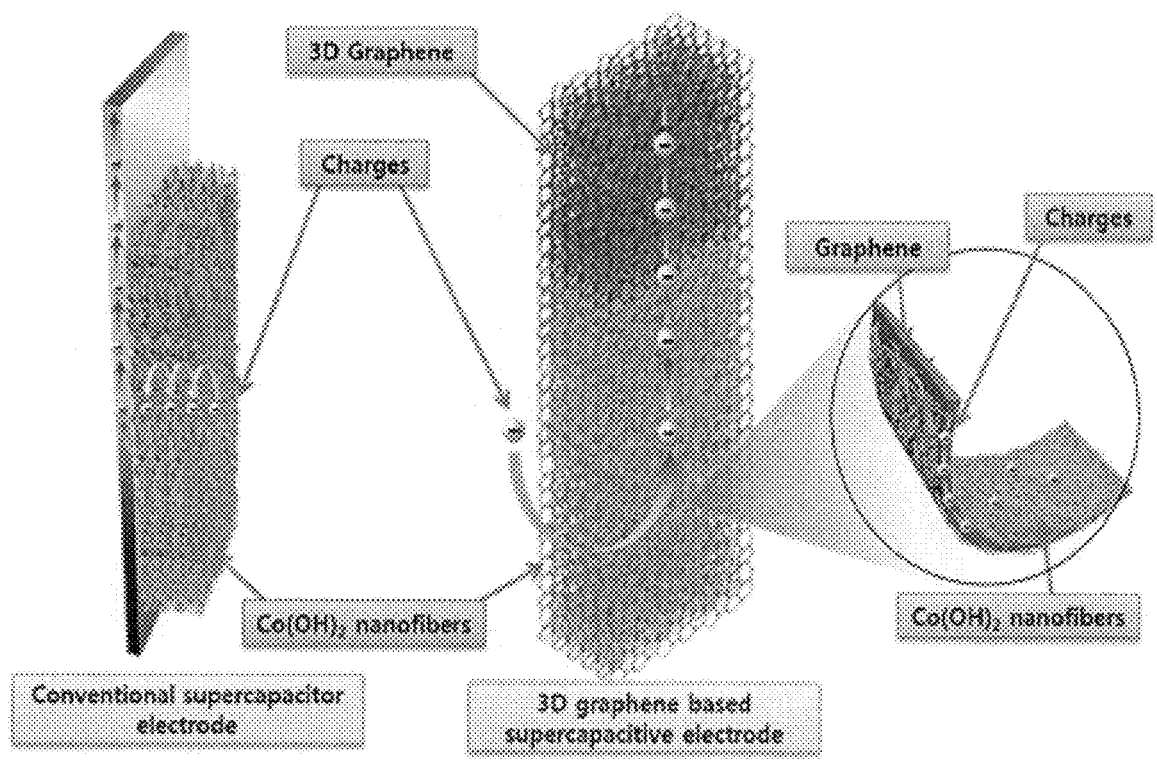

On the other hand, a separate testing is carried out on the composite prepared using a cobalt hydroxide as an electrode material nanoparticle. The entire concept of using a cobalt hydroxide as an electrode material nanoparticle is illustrated in FIG. 10.

Experiment 6. Preparation of Electrode Using Cobalt Hydroxide and Charge/Discharge Testing An electrode is prepared in the same manner as described in Sample 5 and then used as a working electrode, with an Ag/AgCl electrode used as a reference electrode and a Pt electrode as a relative electrode. Using a 1M KOH solution, the measurement is carried out at the room temperature.

The testing is performed at the voltage interval ranging from −0.2 V to 0.4 V and the current density of 5 to 25 A/g to calculate the specific capacitance.

Figure 1P:
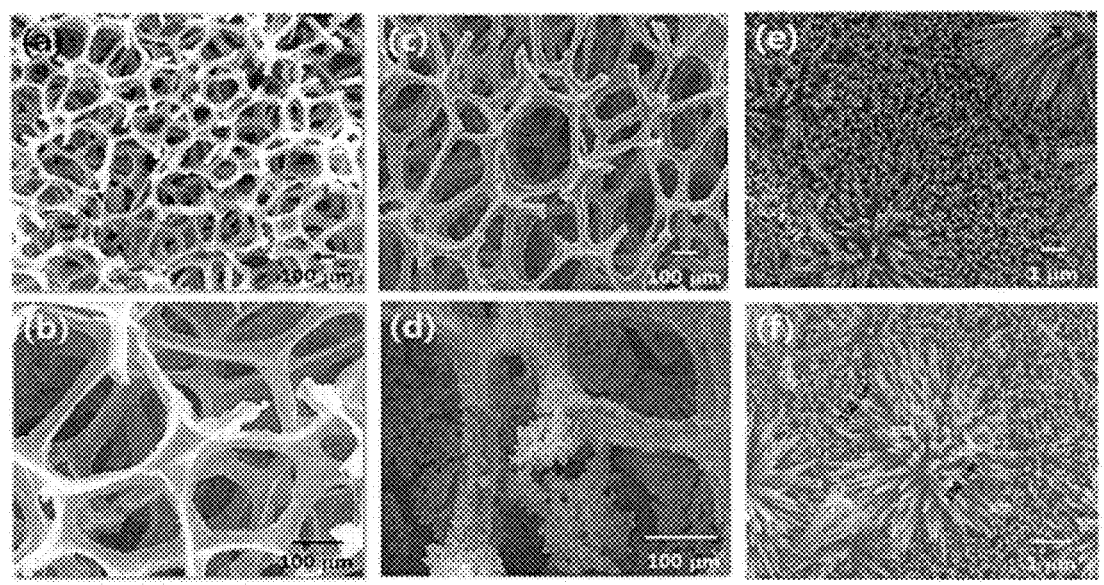
Figure 1Q:
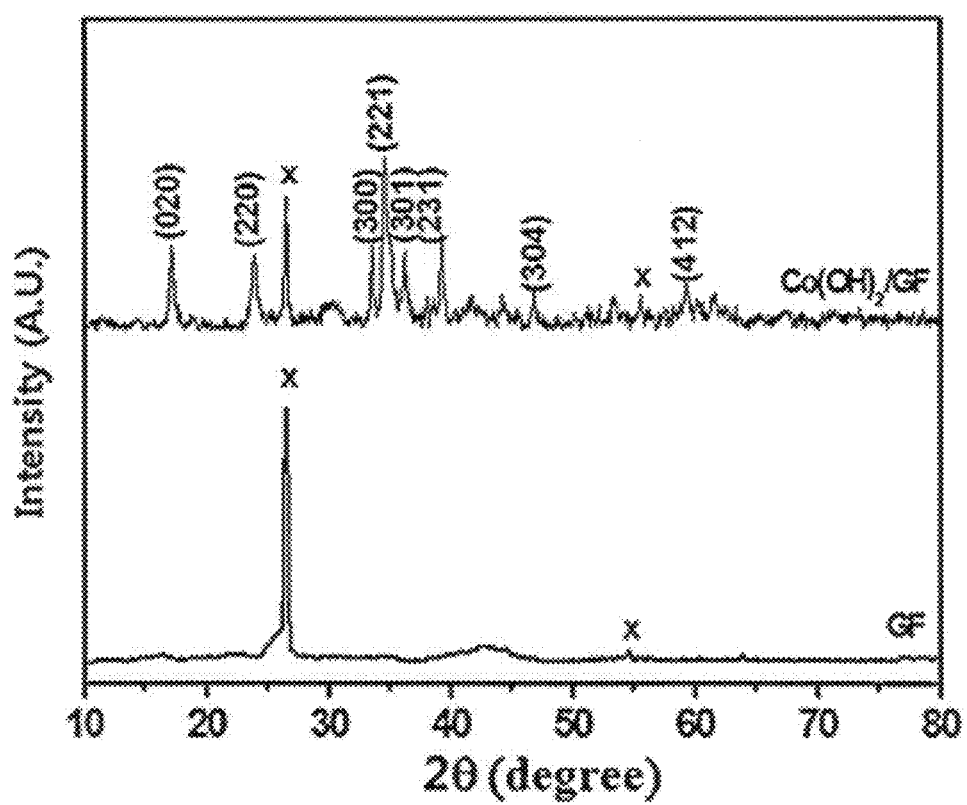
Figure 1R:
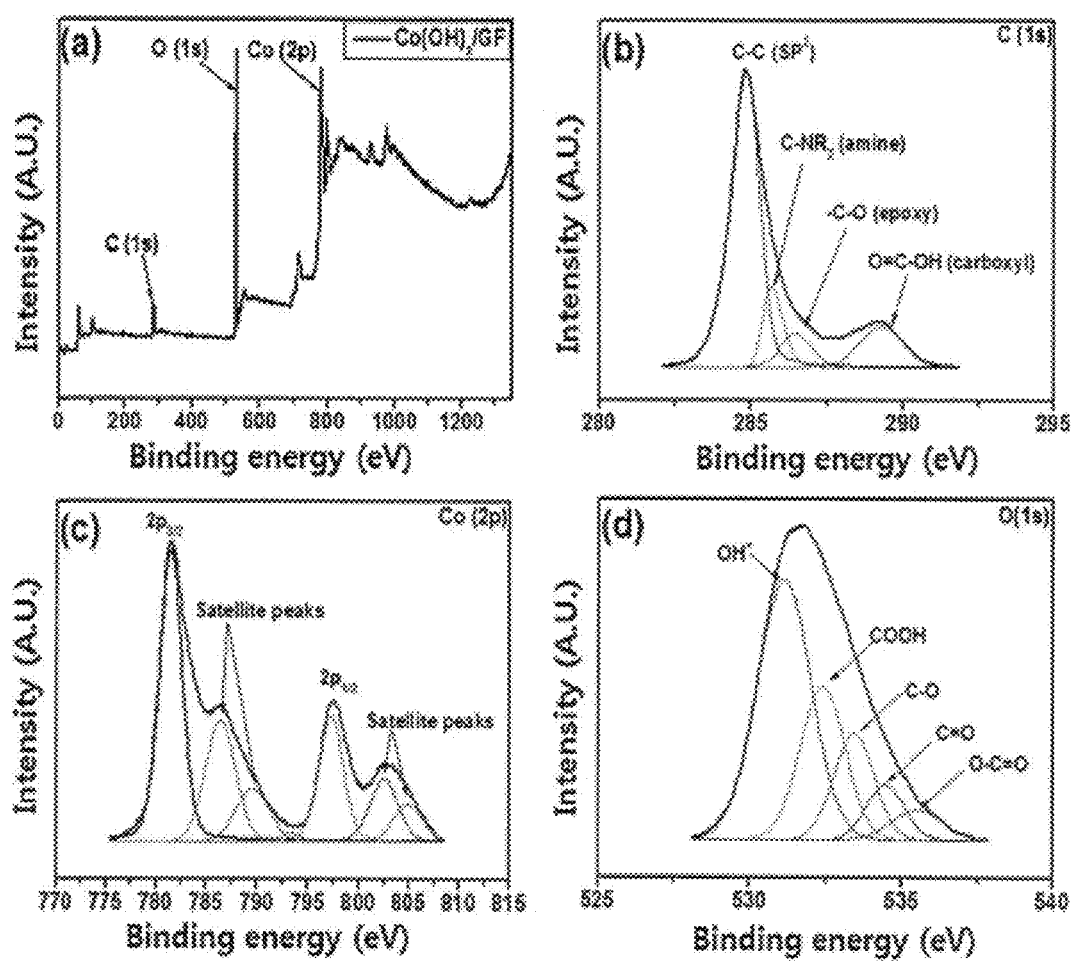
Figure 1S:
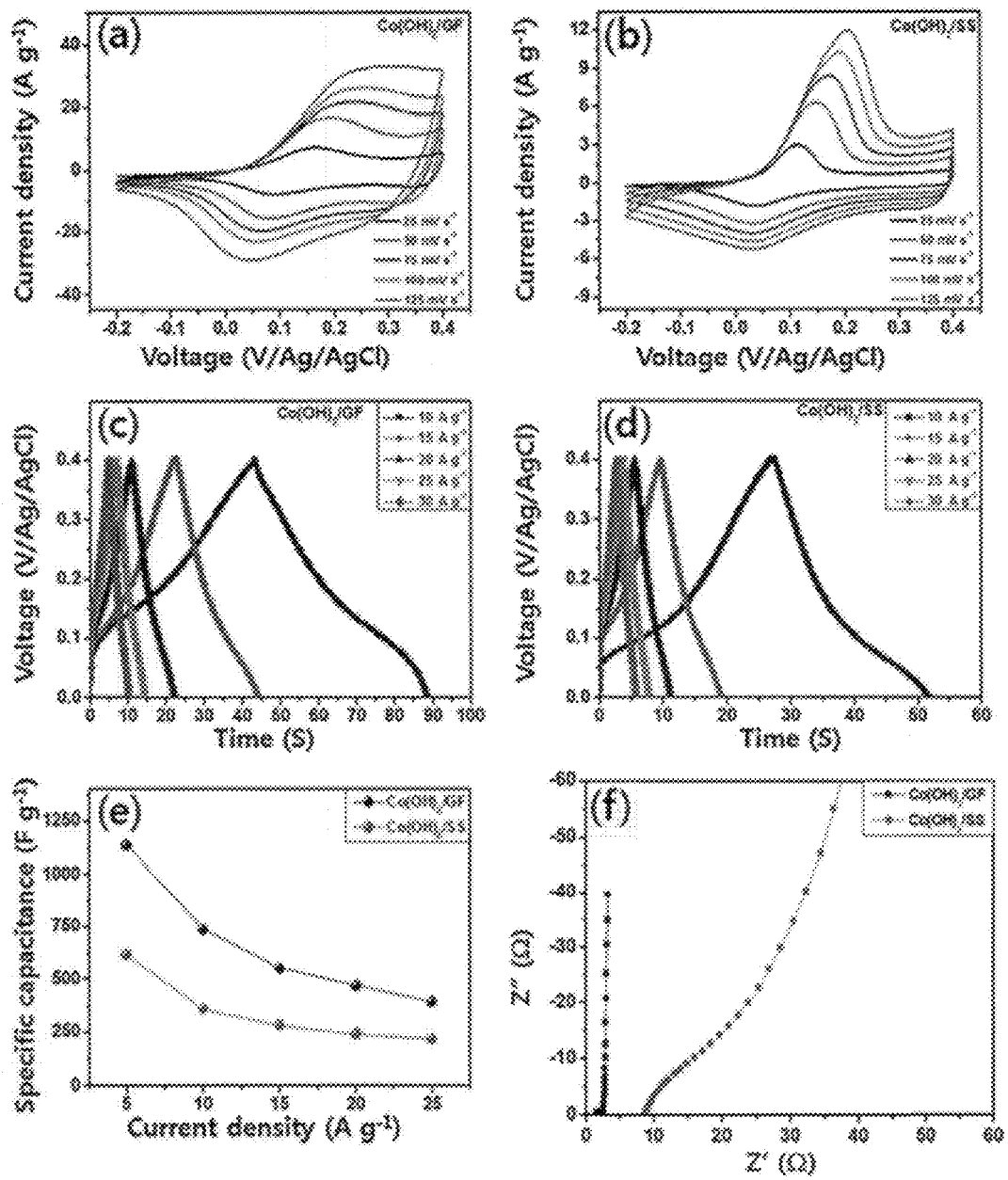
Figure 1T:
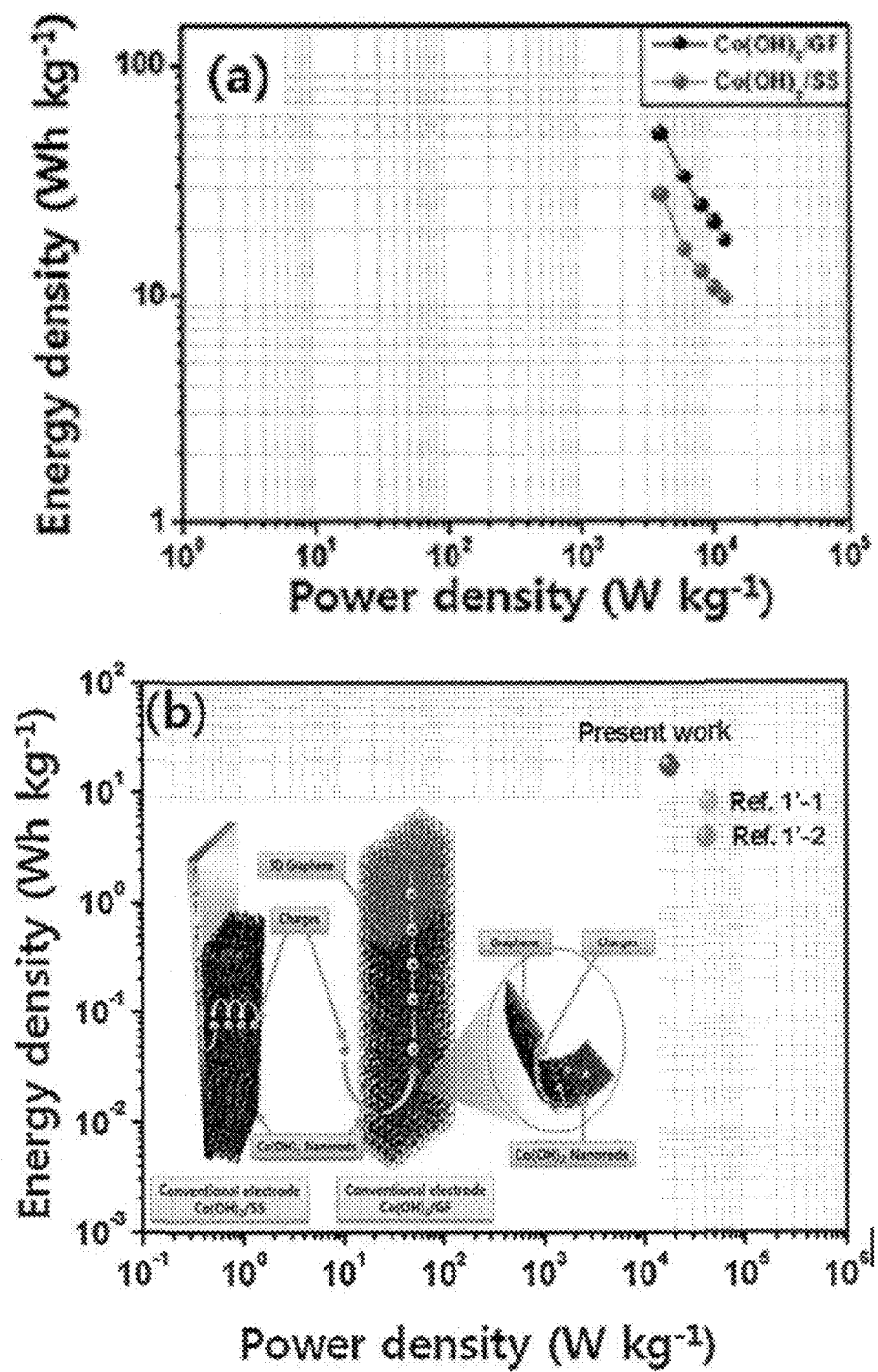

To evaluate the electrical characteristics as an electrode material, the same equipment as mentioned in Experiment 1 is used at the current density of 5 A/g to calculate the specific capacitance in the unit of farad (F) (FIGS. 1S and 1T).

TABLE 3

| Electron collector | Specific capacitance (F/g) | Energy density (Wh/kg) | Power density (kW/kg) |
| --- | --- | --- | --- |
| Sample 5 | 1130 | 49 | 10 |
| Stainless steel | 630 | 21 | 9 |

Referring to Table 3, the supercapacitor electrode according to Sample 5 which enables to use the three-dimensional graphene foam in an electron collector can exhibit a specific capacitance of 1130 F/g, which is considerably far higher than the maximum specific capacitance of 630 F/g obtainable with the reference material, stainless steel, as the electron collector.

On the other hand, FIG. 1T(b) shows the comparison in the performance as a function of the energy density between the electron collectors according to Ref. 1'-1 (A. D. Jagadale, V. S. Kumbhar, D. S. Dhawale, C. D. Lokhande, Performance evaluation of symmetric supercapacitor based on cobalt hydroxide [Co(OH)$_2$] thin film electrodes, Electrochim. Acta 98 (2013) 32) and Ref. 1'-2 (M. Jayalakshmi, K. Balasubramanian, Simple capacitors to supercapacitors Anoverview, Int. J. Electrochem. Sci. 3 (2008) 1196).

Experiment 7. Analysis on the Surface, Structure and Chemical Bonds of Electrode Using Cobalt Hydroxide As for the cobalt hydroxide/graphene foam composite prepared according to Sample 5, the surface is observed with a scanning electrode microscope (FIG. 1P), the composite structure is analyzed using the X-ray diffractometer (FIG. 1Q), and the chemical bonds are identified by the X-ray photoelectron spectroscopy (FIG. 1R).

Figure 2A:
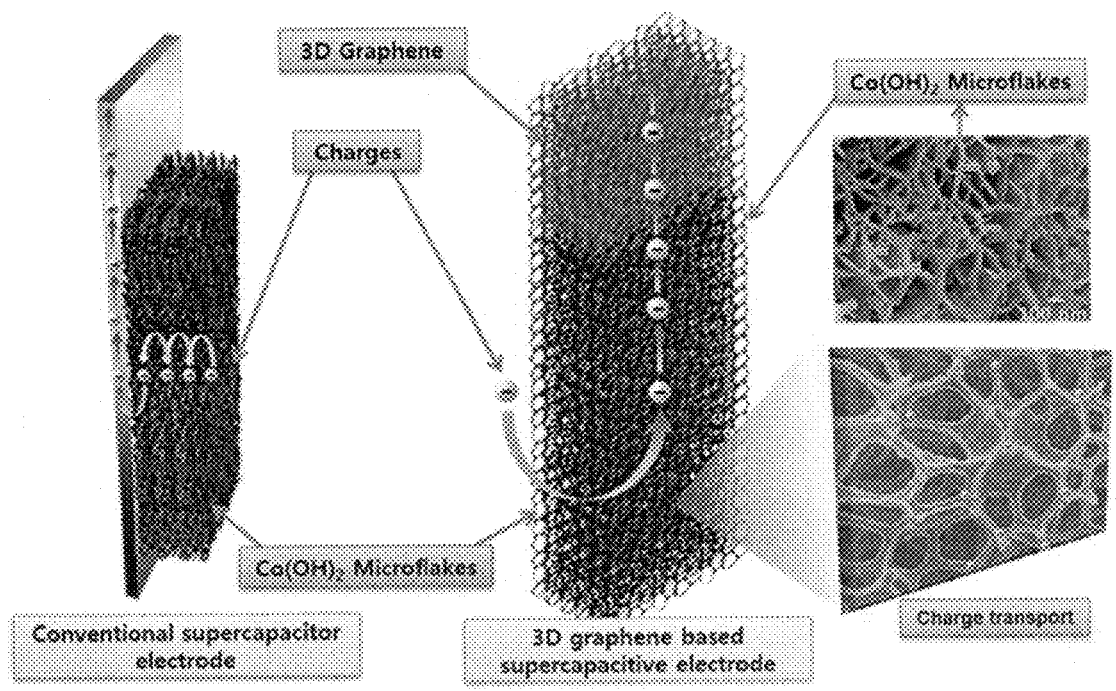
FIGS. 2A to 2G illustrate Example 2 using $Co(OH)_2$ as an electrode material nanoparticle and an electrodeposition method.

[Example 2] Nanoflake-Like Composite Using Co(OH)$_2$ Adsorbed as an Electrode Material Nanoparticle Through Electrodeposition Example 2 involves depositing a nanoflake-like cobalt hydroxide on the surface of a graphene foam by a novel deposition method, electrodeposition, while Example 1 involves depositing a nanorod-like cobalt hydroxide on the surface of a graphene foam by the chemical bath deposition method. The whole concept of Example 2 is illustrated in FIG. 2A.

Figure 2B:
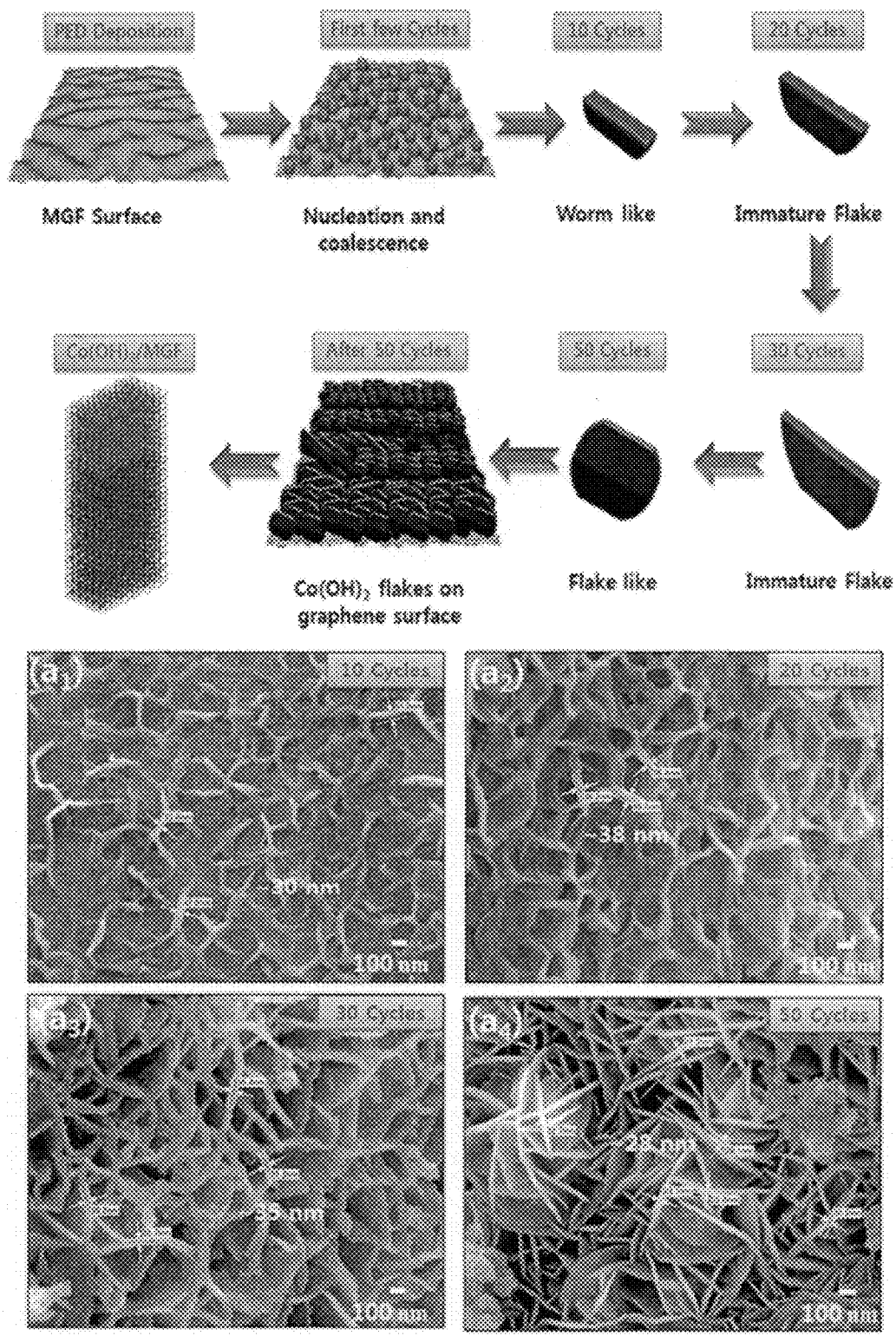

The prepared graphene foam is immersed into an aqueous solution of cobalt salt, which solution is neutral. Preferably, the cobalt hydroxide is slowly deposited by circulating the electric current 20 to 50 cycles according to the potentio dynamic electrodeposition—cyclic voltammetry method at the potential ranging from 1.2 V to 0 V and the scan rate of 50 mV/s. The preparation method using the cyclic voltammetry is illustrated in FIG. 2B.

In this regard, sodium sulfate (Na$_2$SO$_4$) may be added as a conducing material that is a kind of reagent in order to evenly adsorb the cobalt hydroxide on the surface of the graphene foam and enhance the adsorption yield. This can enhance the electrical conductivity of the aqueous solution of cobalt salt.

Experiment 1. Preparation of Cobalt Hydroxide/Graphene Foam Composite Using Electrodeposition The preparation method for graphene foam is the same as described in Example 1.

After the preparation of the graphene foam, a 0.1M aqueous solution of cobalt (II) nitrate hexahydrate (Co(NO$_3$)$_2$.6H$_2$O) is prepared and the graphene foam is immersed into the aqueous solution. Then, adsorption is performed for 20 to 50 cycles according to the potentiodynamic electrodeposition method using cyclic voltammetry at a potential ranging from −1.2 V to 0 V and a defined scan rate.

Subsequently, distilled water is used to eliminate the reaction residues from the surface of the hydroxide/graphene foam sample to prepare the final nanoflake type cobalt hydroxide/graphene foam composite.

Experiment 2. Charge/Discharge Testing on Electrode Using Cobalt Hydroxide

The electrode prepared is used as a working electrode, with an Ag/AgCl electrode used as a reference electrode and a Pt electrode as a relative electrode. Using a 1M KOH solution, the measurement is carried out at the room temperature.

The testing is performed at the voltage interval ranging from −0.2 V to 0.4 V and the current density of 9 to 45 A/g to calculate the specific capacitance.

Figure 2C:
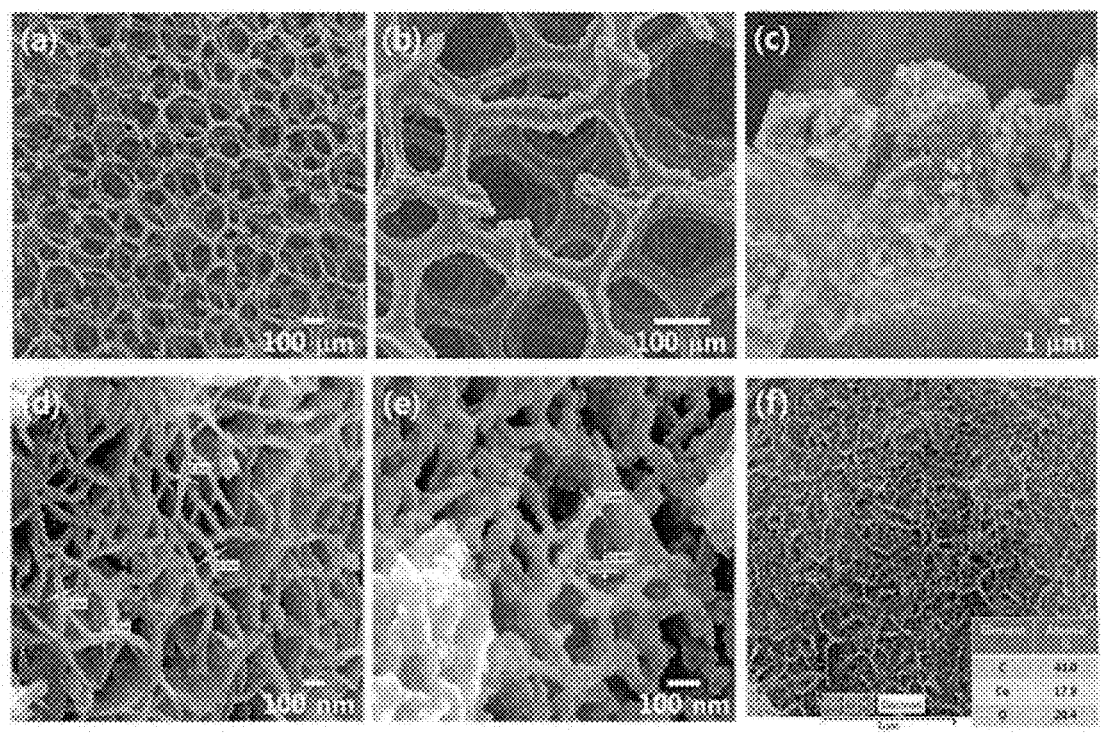
Figure 2D:
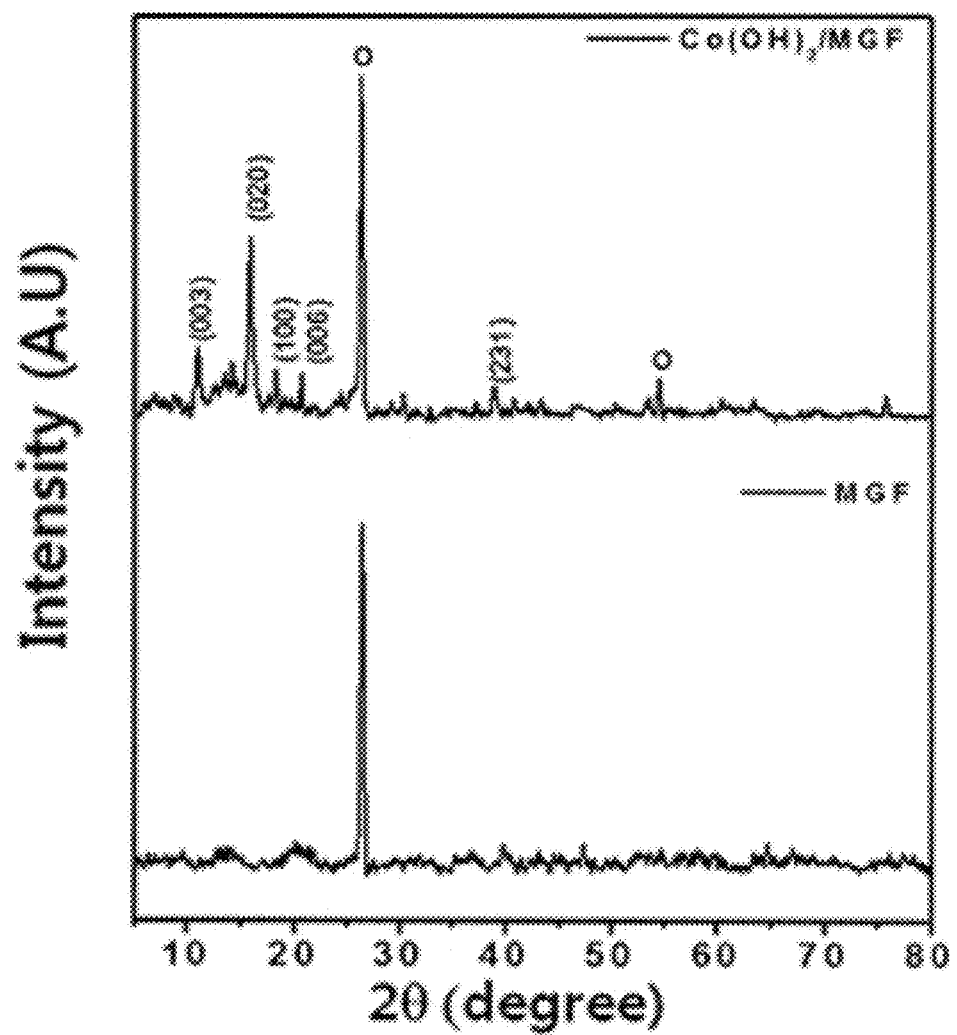
Figure 2E:
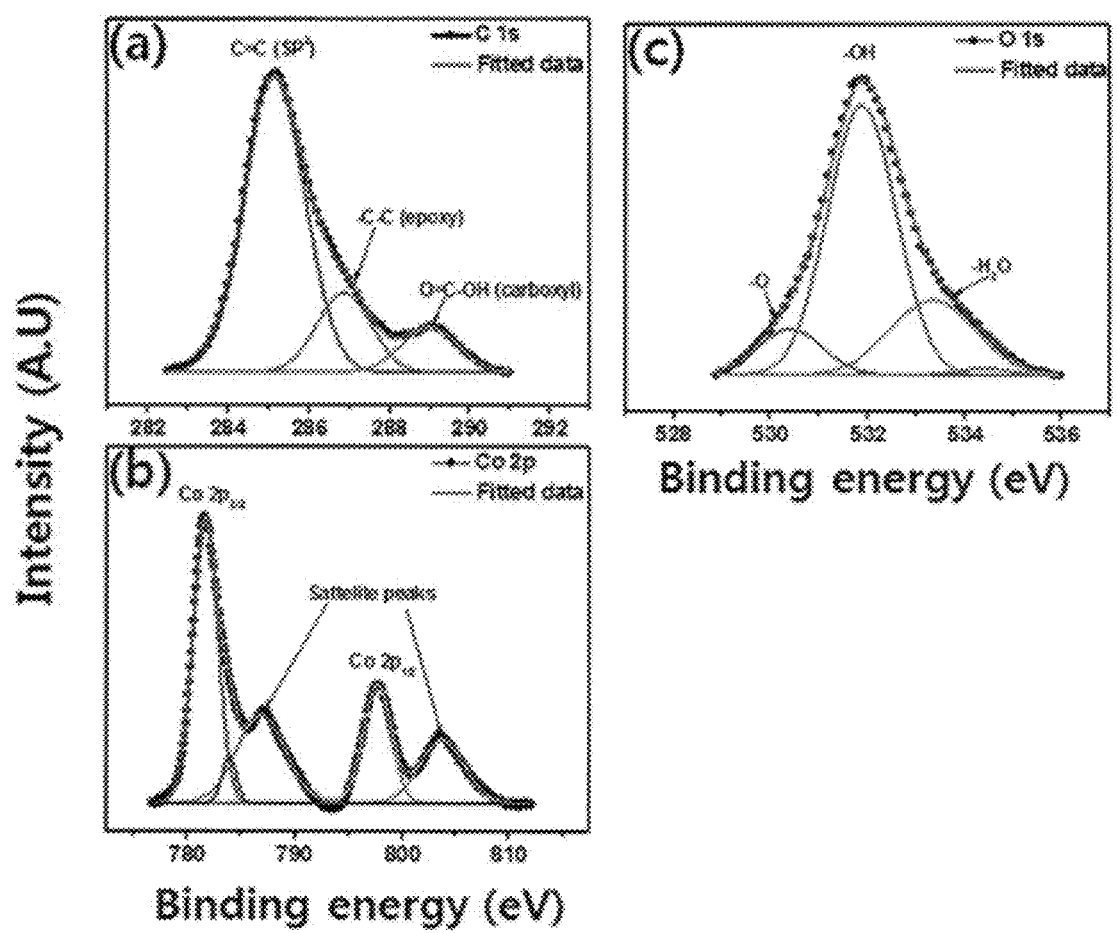
Figure 2F:
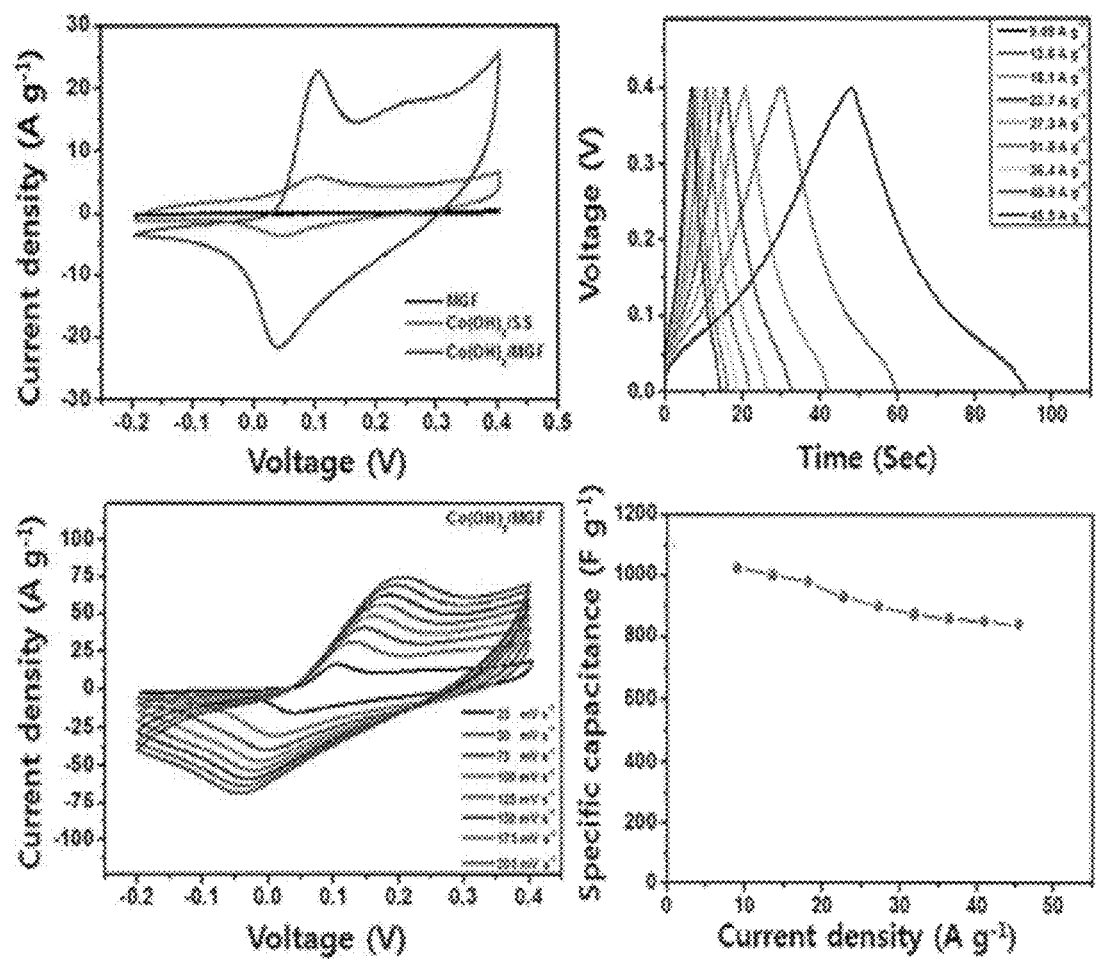
Figure 2G:
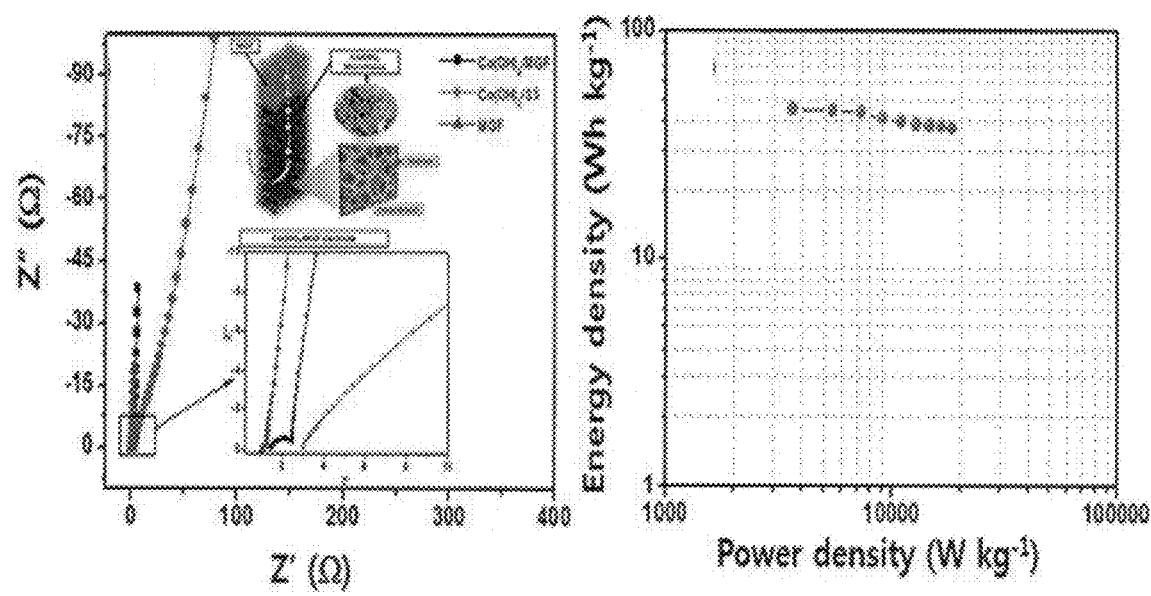

To evaluate the electrical characteristics as an electrode material, the same equipment as mentioned in Example 1 is used at the current density of 9 A/g to calculate the specific capacitance in the unit of farad (F) (FIGS. 2F and 2G)

TABLE 4

| Electron collector | Specific capacitance (F/g) | Energy density (Wh/kg) | Power density (kW/kg) |
| --- | --- | --- | --- |
| Experiment 1 | 1030 | 37 | 12 |
| Stainless steel | 410 | — | — |

Referring to Table 4, the supercapacitor electrode according to Example 2 which enables to use the three-dimensional graphene foam in an electron collector can exhibit a specific capacitance of 1030 F/g, which is considerably far higher than the maximum specific capacitance of 410 F/g obtainable with the reference material, stainless steel, as the electron collector.

Experiment 3. Analysis on the Surface, Structure and Chemical Bonds of Electrode Using Cobalt Hydroxide As for the cobalt hydroxide/graphene foam composite prepared according to Experiment 1, the surface is observed with a scanning electrode microscope (FIG. 2C), the composite structure is analyzed using the X-ray diffractometer (FIG. 2D), and the chemical bonds are identified by the X-ray photoelectron spectroscopy (FIG. 2E).

[Example 3] The Use of $MnO_2$ as an Electrode Material Nanoparticle

The procedures are performed in the same manner as described in Example 1 to adsorb an electrode material nanoparticle onto the surface of the graphene foam using the chemical bath deposition method, excepting that manganese oxide ($MnO_2$) is used as the electrode material nanoparticle.

Experiment 1. Preparation of Manganese Oxide/Graphene Foam Composite

Figure 3A:
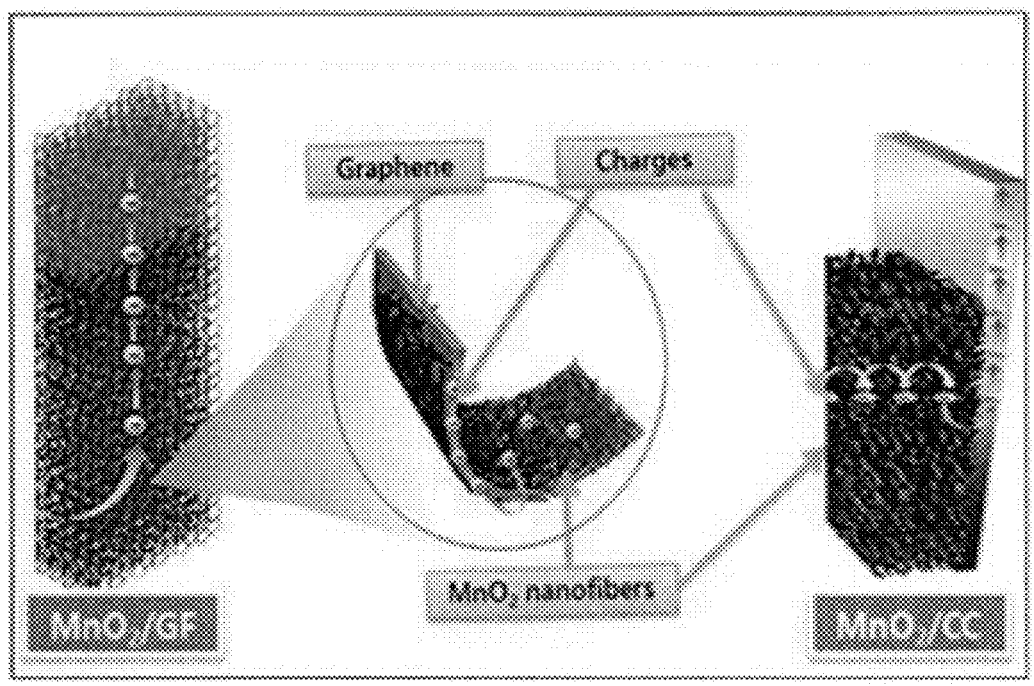
FIGS. 3A to 3F illustrate Example 3 using $MnO_2$ as an electrode material nanoparticle.

The procedures are performed in the same manner as described in Example 1, excepting that a manganese salt is used as a precursor of the electrode material nanoparticle, with ammonium persulfate used as a reductant. The entire concept of Example 3 is illustrated in FIG. 3A.

The procedures of preparing a graphene foam is performed in the same manner as described in Example 1, except for the solution prepared after the completion of the graphene foam. More specifically, manganese sulfate ($MnSO_4$) and ammonium persulfate ($(NH_4)_2S_2O_8$) are mixed together at a ratio of 2:5, and 50 ml of distilled water is added to the mixture. After 10-minute mechanical agitation, a mixed solution is completed.

The graphene foam is immersed into the mixed solution, which is then warmed up at 90° C. for 4 hours. In this regard, for the purpose of uniform heat supply, the container containing the mixed solution is preferably surrounded with paraffin oil and continuously stirred with a magnetic stirrer. Subsequently, the mixed solution is naturally cooled down to the room temperature. After the formation of an oxide, distilled water is used to wash the oxide/graphene foam sample to eliminate all the residues from the surface of the sample.

Experiment 2. Charge/Discharge Testing on Electrode Using Manganese Oxide

The electrode prepared is used as a working electrode, with an Ag/AgCl electrode used as a reference electrode and a Pt electrode as a relative electrode. Using a 1M $Na_2SO_4$ solution, the measurement is carried out at the room temperature.

The testing is performed at the voltage interval ranging from 0 V to 1.0 V and the scan rate of 10 to 125 mV/s to calculate the specific capacitance.

Figure 3B:
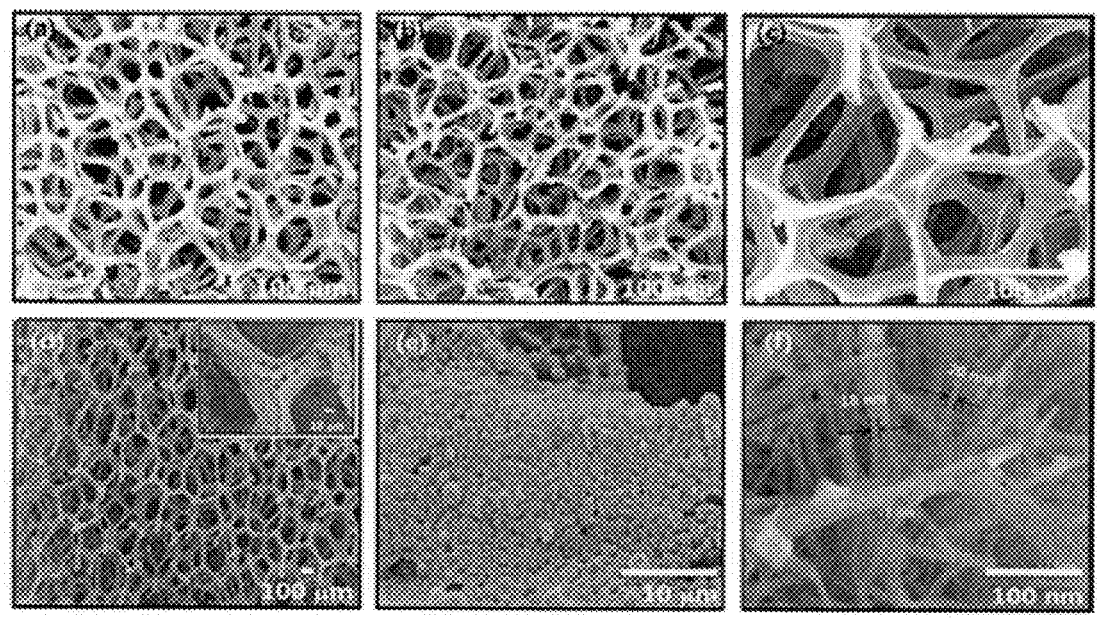
Figure 3C:
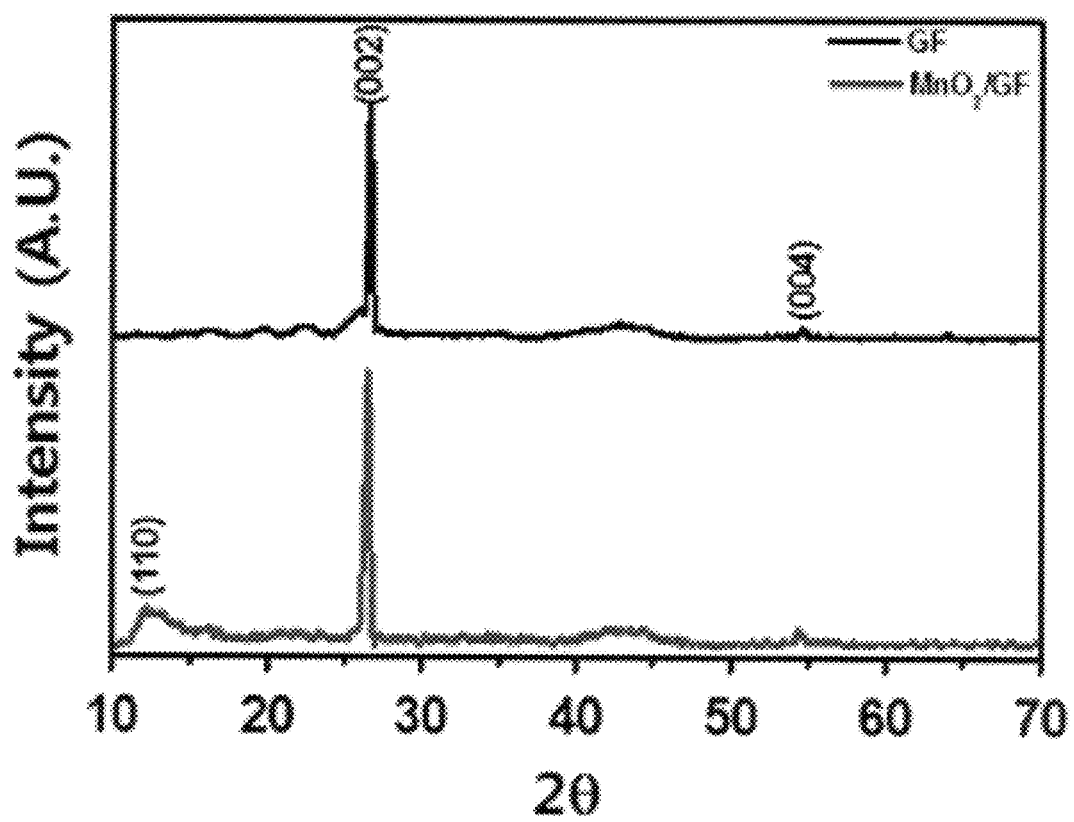
Figure 3D:
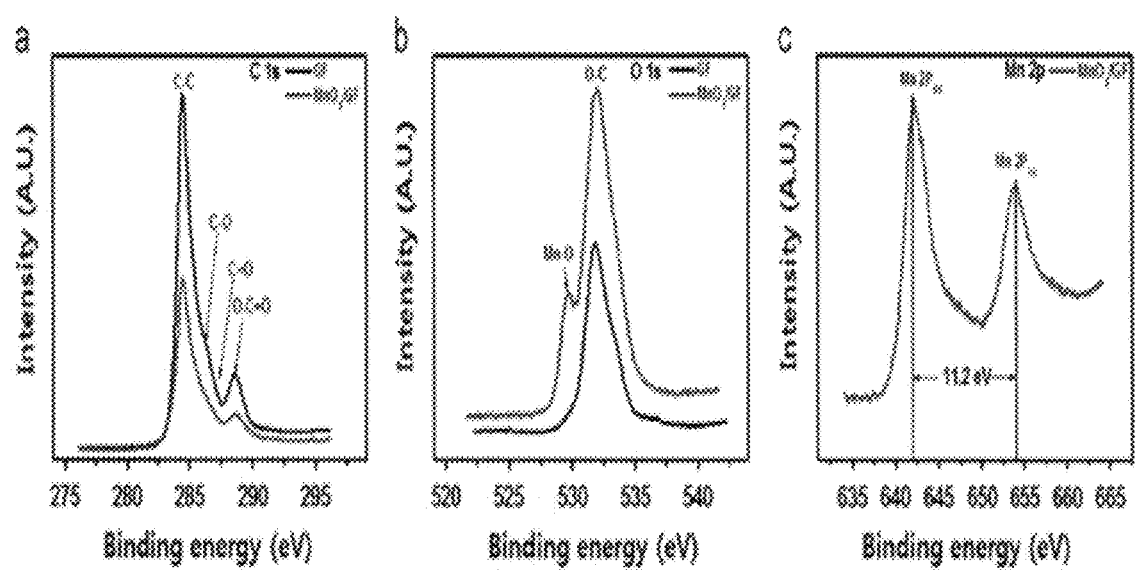
Figure 3E:
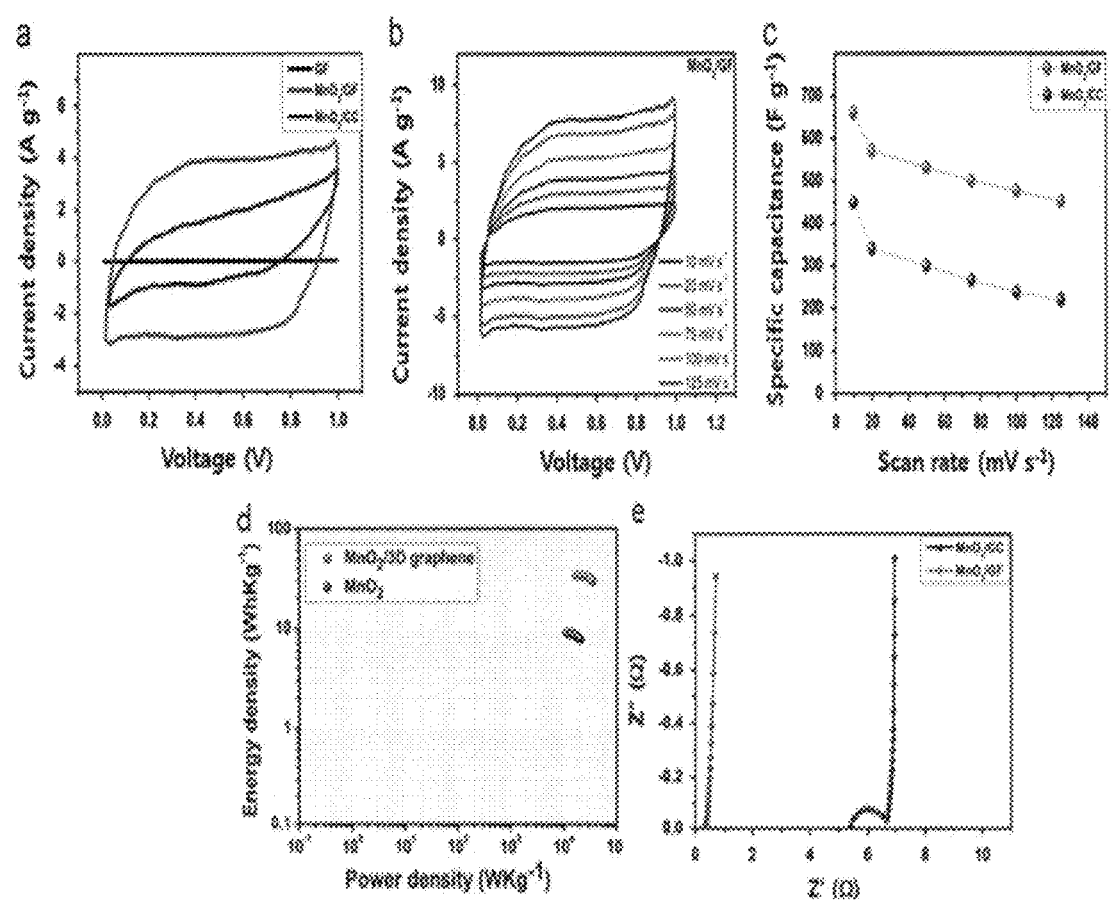
Figure 3F:
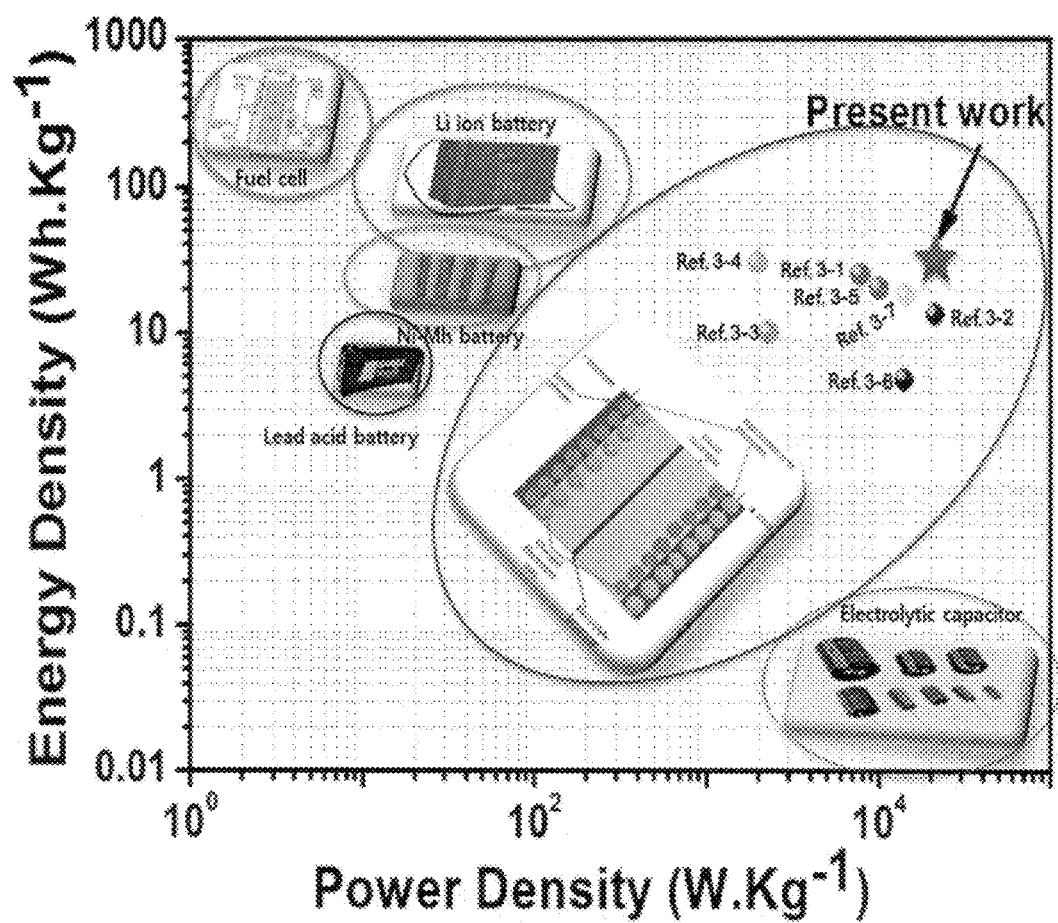

To evaluate the electrical characteristics as an electrode material, the same equipment as mentioned in Example 1 is used at the scan rate of 10 mV/s to calculate the specific capacitance in the unit of farad (F) (FIGS. 3E and 3F)

TABLE 5

| Electron collector | Specific capacitance (F/g) | Energy density (Wh/kg) | Power density (kW/kg) |
| --- | --- | --- | --- |
| Experiment 1 | 670 | 34.1 | 17.5 |
| Stainless steel | 440 | 8.7 | 9.7 |

Referring to Table 5, the supercapacitor electrode according to Example 3 which enables to use the three-dimensional graphene foam in an electron collector can exhibit a specific capacitance of 670 F/g, which is considerably far higher than the maximum specific capacitance of 440 F/g obtainable with the reference material, stainless steel, as the electron collector.

Further, when compared with other electron collectors reported in Ref. 3-1 (L. Deng, G. Zhu, J. Wang, L. Kang, Z-H Liu, Z. Yang, Z. Wang, J. Power Sources 196 (2011) 10782), Ref. 3-2 (J. Zhu, W. Shi, N. Xiao, X. Rui, H. Tan, X. Lu, H. H. Hng, J. Ma, Q. Yan, ACS Appl. Mater. Interfaces, 4 (2012) 2769), Ref. 3-3 (Q. Qu, P. Zhang, B. Wang, Y. Chen, S. Tian, Y. Wu, R. Holze, J. Phys. Chem. C, 113 (2009) 14020), Ref. 3-4 (Y. Cheng, H. Zhang, S. Lu, C. V. Varanasi, J. Liu, Nanoscale, 5 (2013) 1067-73), Ref. 3-5 (K. Chiang, S. Zhang, C. Peng, G. Z. Chen, J. Electrochem. Soc., 156 (2009) A846.), Ref. 3-6 (Z. Lei, J. Zhang, X. S. Zhao, J. Mater. Chem., 22 (2012) 153), Ref. 3-7 (L. Yuan, X-H. Lu, X. Xiao, T. Zhai, J. Dai, F. Zhang, B. Hu, X. Wang, L. Gong, J. Chen, C. Hu, Y. Tong, J. Zhou, Z. L. Wang, ACS Nano, 6 (2012) 656), etc., the electron collector using the supercapacitor electrode according to Example 3 is enhance in the energy density, which can be seen from FIG. 3F.

Experiment 3. Analysis on the Surface, Structure and Chemical Bonds of Electrode Using Manganese Oxide As for the manganese oxide/graphene foam composite prepared according to Experiment 1, the surface is observed with a scanning electrode microscope (FIG. 3B), the composite structure is analyzed using the X-ray diffractometer (FIG. 3C), and the chemical bonds are identified by the X-ray photoelectron spectroscopy (FIG. 3D).

[Example 4] The Use of Polyaniline as an Electrode Material Nanoparticle

Figure 4A:
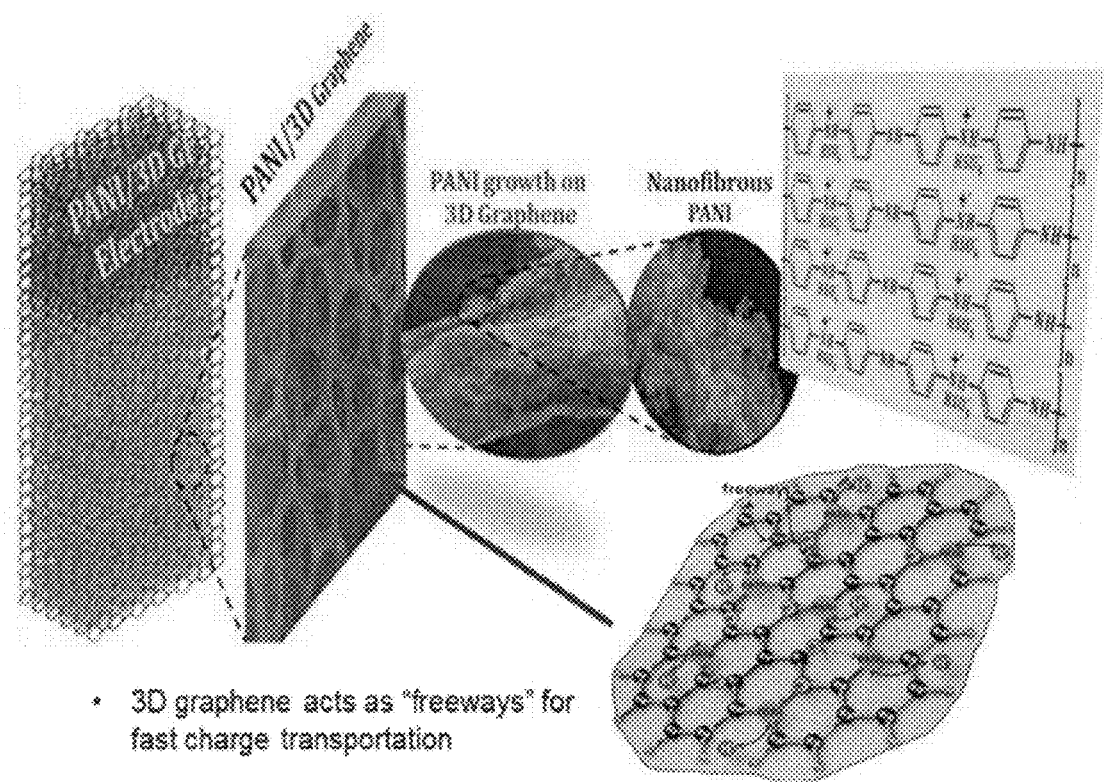
FIGS. 4A to 4G illustrate Example 4 using polyaniline as an electrode material nanoparticle.
Figure 4B:
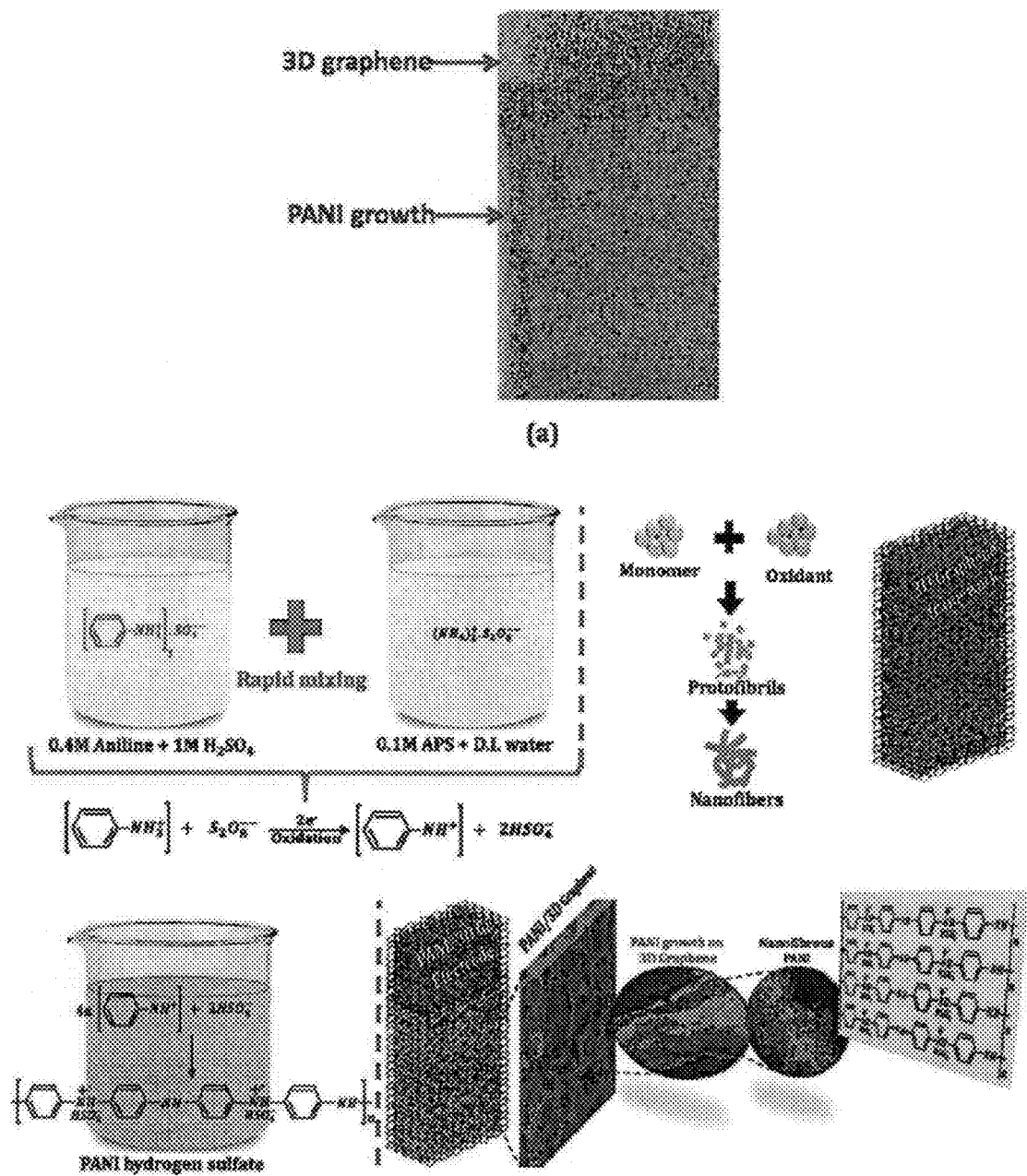
Figure 4C:
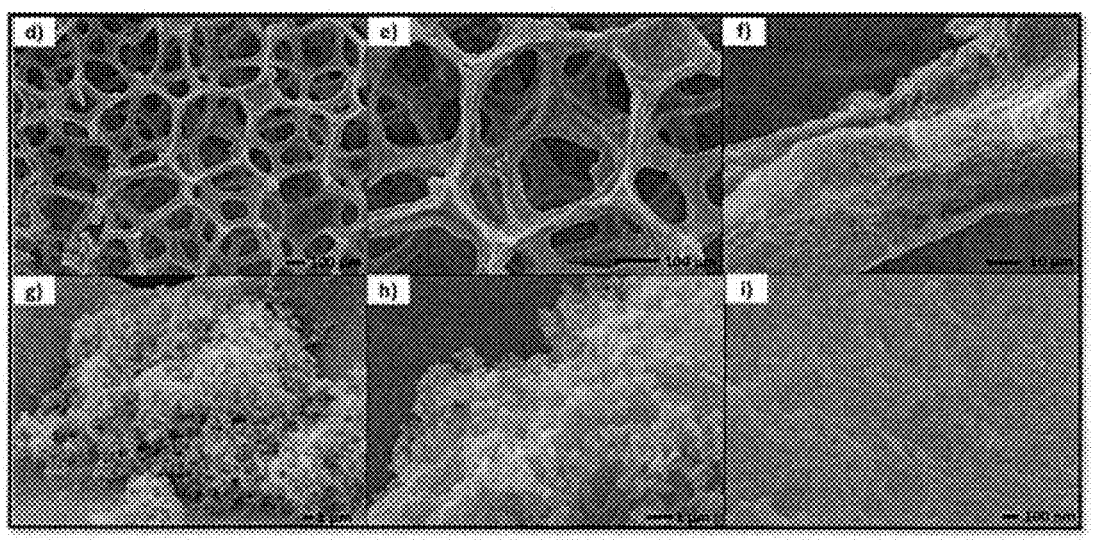

The electrode material nanoparticle is adsorbed onto the surface of the graphene foam, provided that polyaniline among the conducting polymers is used as the electrode material nanoparticle. The entire concept of Example 4 is illustrated in FIG. 4A, and the preparation method of Example 4 is shown in FIG. 4B.

In Example 4, as different from the other Examples, the solution prepared to form polyaniline on the surface of the graphene foam contains an aniline monomer and an initiator for polymerization of the monomer into the polymer as a reagent. For ensuring an even adsorption of the polyaniline, it is preferable to perform the step of immersing the graphene foam into the solution at a relatively low temperature of 4 to 25° C.

Experiment 1. Preparation of Polyaniline/Graphene Foam Composite

The procedures are performed in the same manner as described in the other Examples to prepare a graphene foam, excepting that the prepared solution contains 0.1 M aniline ($C_6H_5NH_2$) monomer and 0.1 M ammonium persulfate. More specifically, 1 to 3 ml of an aqueous solution of ammonium persulfate is added to 50 ml of an aqueous solution of aniline monomer, and the mixed solution is mechanically stirred for 1 to 5 minutes. The graphene foam is immersed into the mixed solution, which is then subjected to the fast reaction for about 10 minutes. In this regard, the mixed solution is continuously stirred with a magnetic stirrer to effectively induce the reaction uniform.

After the formation of polyaniline, distilled water is used to eliminate the reaction residues from the surface of the oxide/graphene foam sample.

Experiment 2. Charge/Discharge Testing on Electrode Using Polyaniline

The electrode prepared is used as a working electrode, with an Ag/AgCl electrode used as a reference electrode and a Pt electrode as a relative electrode. Using a 1M $H_2SO_4$ solution, the measurement is carried out at the room temperature.

The testing is performed at the voltage interval ranging from −0.2 V to 0.8 V and the scan rate of 10 to 100 mV/s to calculate the specific capacitance.

Figure 4D:
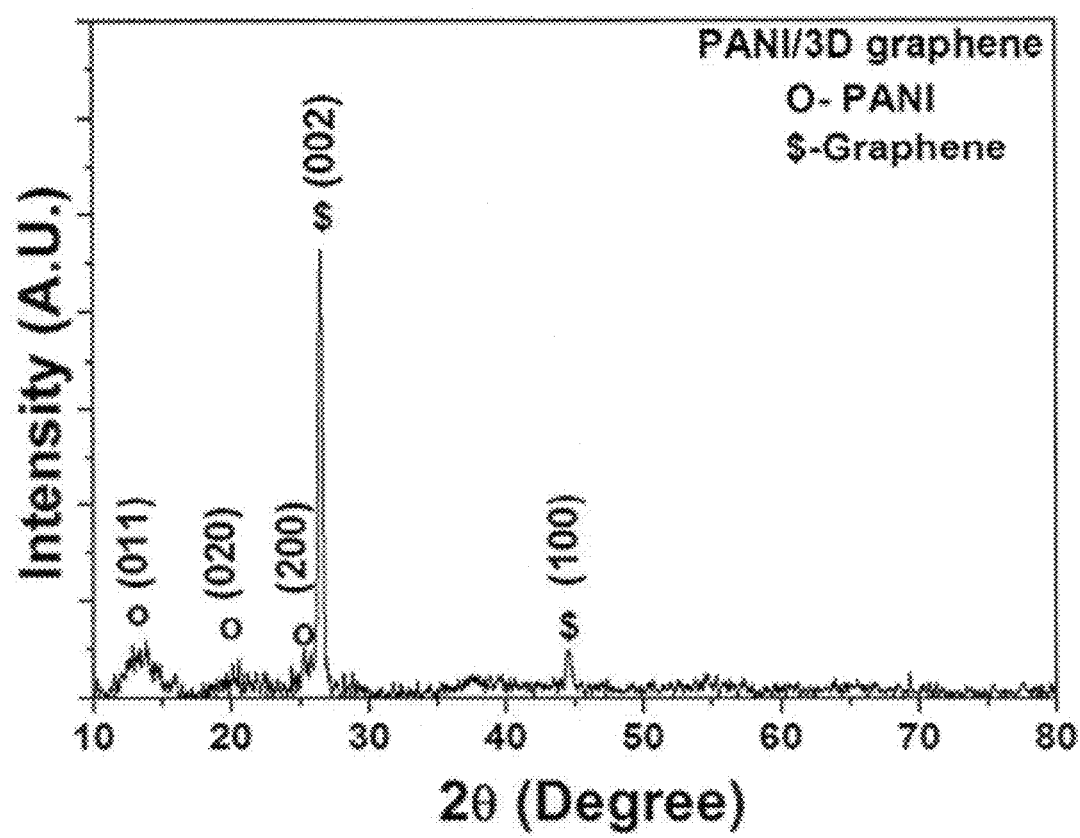
Figure 4E:
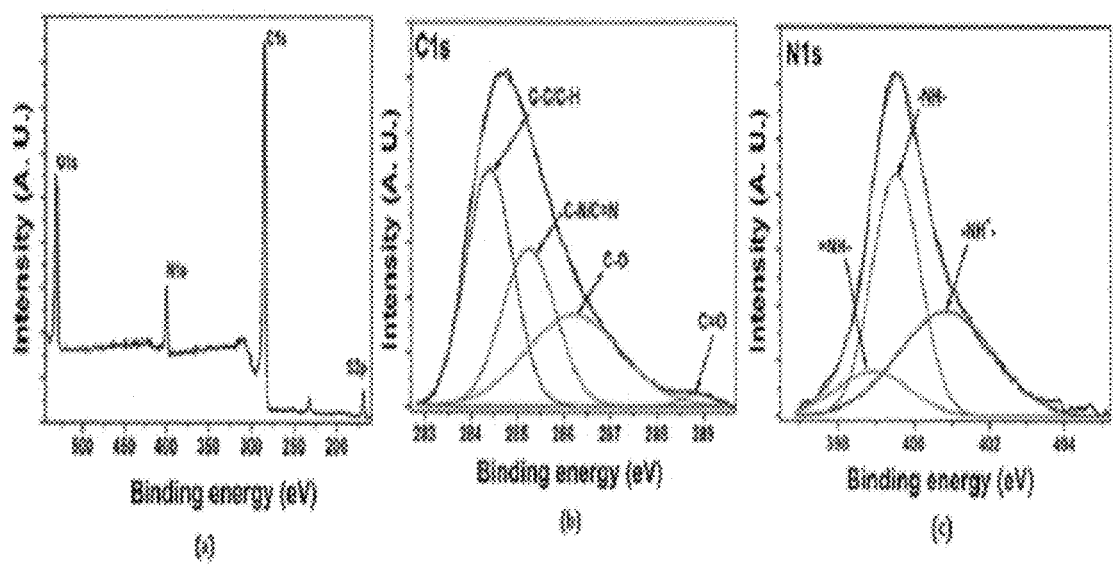
Figure 4F:
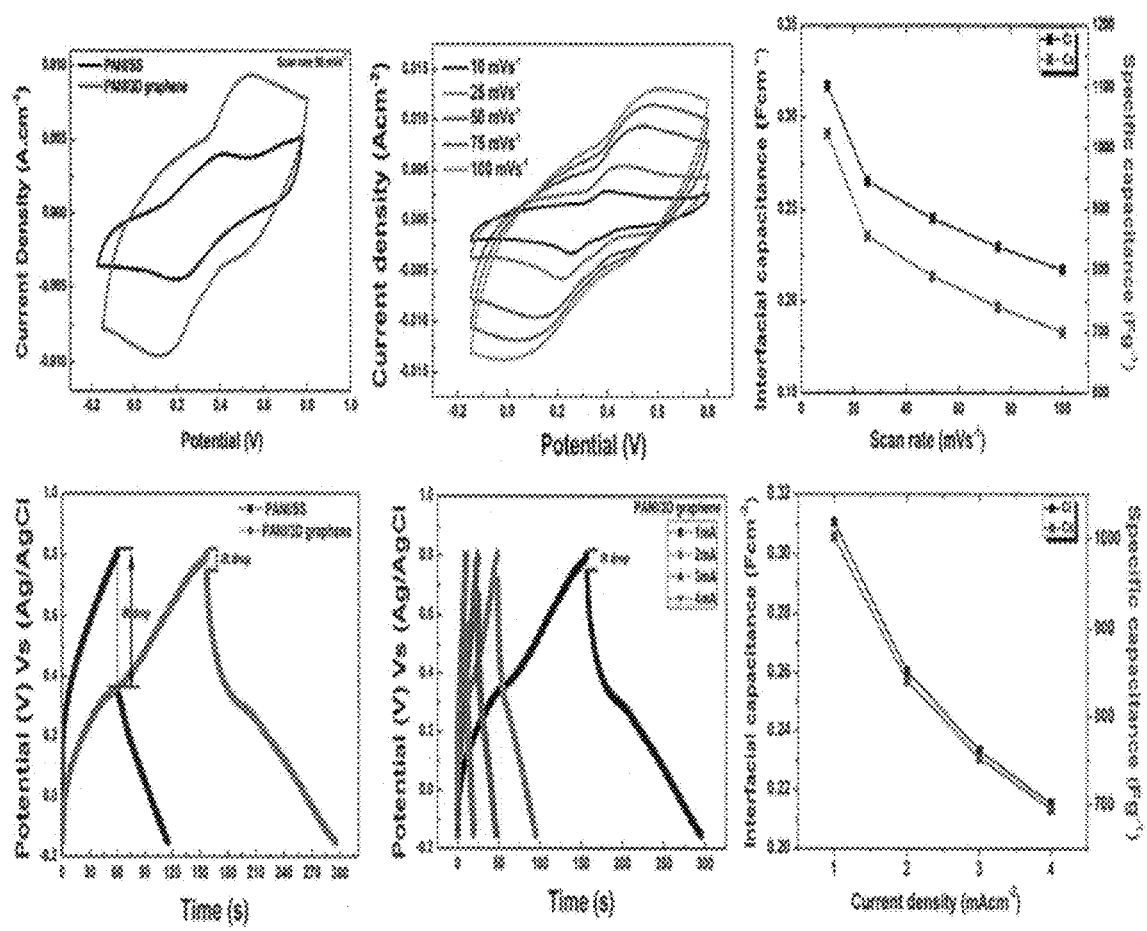
Figure 4G:
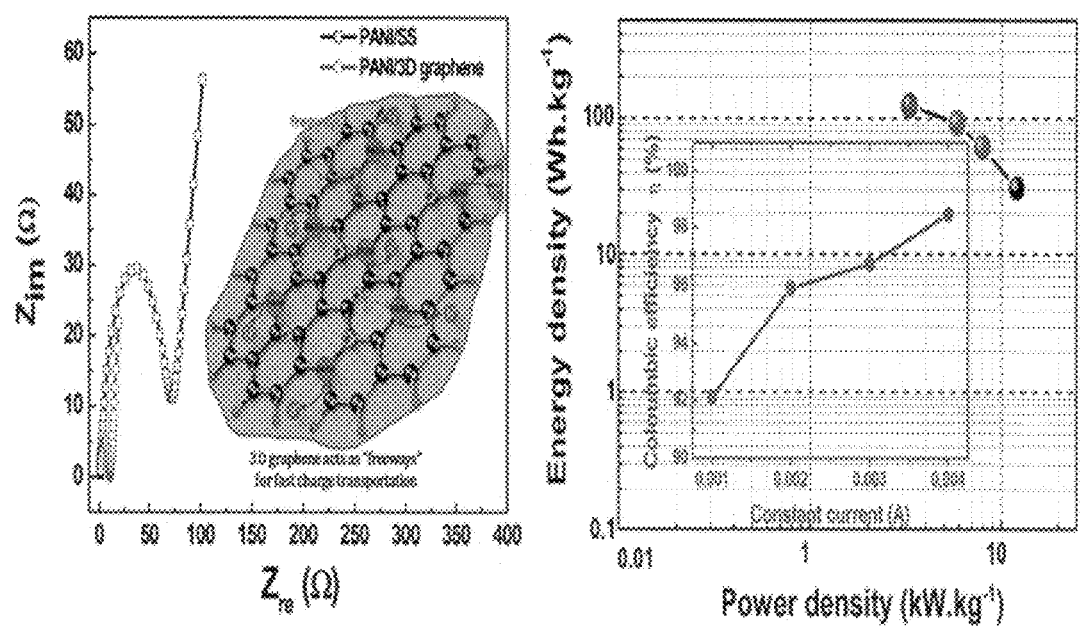
Figure 5:
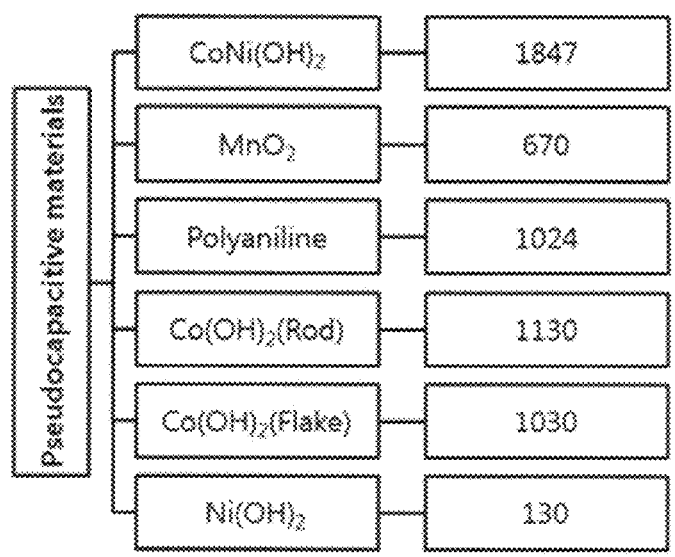
FIG. 5 shows the measurements of pseudocapacitive materials prepared in Examples 1 to 4 in regards to specific capacitance (F/g).
Figure 6:
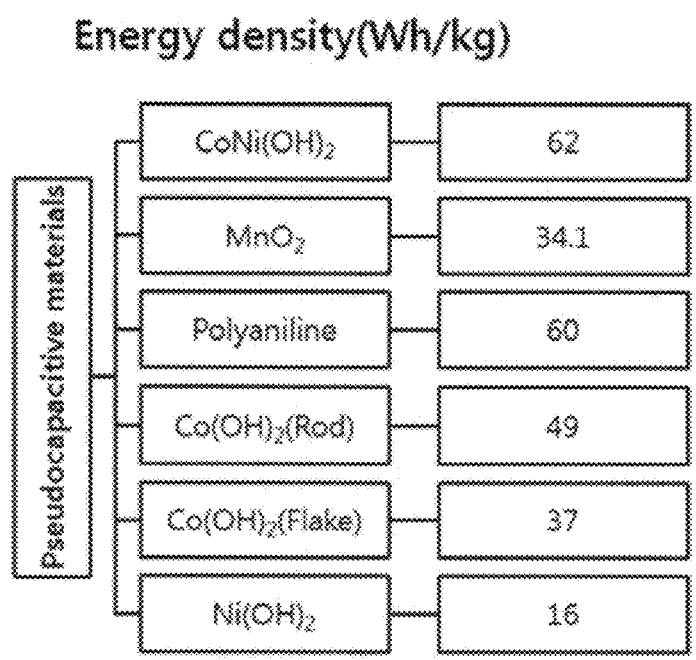
FIG. 6 shows the measurements of pseudocapacitive materials prepared in Examples 1 to 4 in regards to energy density (Wh/kg).
Figure 7:
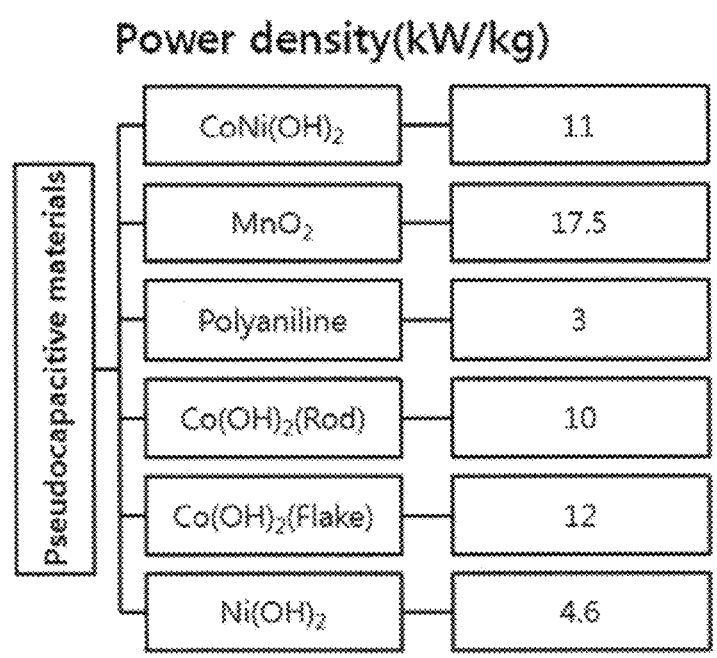
FIG. 7 shows the measurements of pseudocapacitive materials prepared in Examples 1 to 4 in regards to power density (kW/kg).

To evaluate the electrical characteristics as an electrode material, the same equipment as mentioned in Example 1 is used at the scan rate of 10 mV/s to calculate the specific capacitance in the unit of farad (F) (FIGS. 4F and 4G)

TABLE 6

| Electron collector | Specific capacitance (F/g) | Energy density (Wh/kg) | Power density (kW/kg) |
|---|---|---|---|
| Experiment 1 | 1024 | 60 | 3 |
| Stainless steel | 410 | — | — |

Referring to Table 6, the supercapacitor electrode according to Example 4 which enables to use the three-dimensional graphene foam in an electron collector can exhibit a specific capacitance of 1024 F/g, which is considerably far higher than the maximum specific capacitance of 410 F/g obtainable with the reference material, stainless steel, as the electron collector.

Experiment 3. Analysis on the Surface, Structure and Chemical Bonds of Electrode Using Polyaniline As for the polyaniline/graphene foam composite prepared according to Experiment 1, the surface is observed with a scanning electrode microscope (FIG. 40), the composite structure is analyzed using the X-ray diffractometer (FIG. 4D), and the chemical bonds are identified by the X-ray photoelectron spectroscopy (FIG. 4E).

Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A three-dimensional graphene composite comprising:
   a graphene foam having a three-dimensional structure with a plurality of pores; and
   an electrode material nanoparticle adsorbed onto the graphene foam,
   wherein the electrode material nanoparticle is a transition metal hydroxide,
   wherein the transition metal hydroxide is at least one selected from the group consisting of copper hydroxide ($Cu(OH)_2$) and manganese-aluminum hydroxide ($Mn-Al(OH_2)$).

2. A supercapacitor having an electrode using the three-dimensional graphene composite as claimed in claim 1.

* * * * *